United States Patent
Moore et al.

(10) Patent No.: US 10,855,654 B2
(45) Date of Patent: *Dec. 1, 2020

(54) SESSION IDENTIFIER FOR A COMMUNICATION SESSION

(71) Applicant: Microsoft Technology Licensing, LLC, Redmond, WA (US)

(72) Inventors: Timothy Mark Moore, Bellevue, WA (US); Tin Qian, Redmond, WA (US); Rajesh Gunnalan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/019,244

(22) Filed: Jun. 26, 2018

(65) Prior Publication Data

US 2018/0309717 A1 Oct. 25, 2018

Related U.S. Application Data

(63) Continuation of application No. 15/061,485, filed on Mar. 4, 2016, now Pat. No. 10,237,236, which is a continuation-in-part of application No. 14/750,802, filed on Jun. 25, 2015, now abandoned, which is a
(Continued)

(51) Int. Cl.
*H04L 29/12* (2006.01)
*H04L 29/06* (2006.01)
*H04L 29/08* (2006.01)

(52) U.S. Cl.
CPC ...... *H04L 61/2589* (2013.01); *H04L 65/1069* (2013.01); *H04L 65/60* (2013.01); *H04L 67/146* (2013.01); H04L 61/2517 (2013.01); H04L 61/6063 (2013.01)

(58) Field of Classification Search
CPC ............ H04L 61/2589; H04L 61/6063; H04L 65/1069; H04L 65/60; H04L 61/2517
See application file for complete search history.

(56) References Cited

U.S. PATENT DOCUMENTS 9,241,078 B2 * 1/2016 Forbes ................ H04M 15/06
10,237,236 B2 * 3/2019 Moore ................ H04L 65/1069
10,397,183 B2 * 8/2019 Ravindranath ....... H04L 61/255
(Continued)

FOREIGN PATENT DOCUMENTS

| CN | 1835465 A | 9/2006 |
|---|---|---|
| CN | 101848235 A | 9/2010 |
| WO | 2014121514 A1 | 8/2014 |

OTHER PUBLICATIONS

"Office Action Issued in European Patent Application No. 16745228.3", dated May 6, 2019, 4 Pages.
(Continued)

*Primary Examiner* — David R Lazaro
(74) *Attorney, Agent, or Firm* — NovoTechIP International PLLC

(57) ABSTRACT

Techniques for a session identifier for a communication session are described. According to various implementations, a session identifier that is usable for initiating a communication session is allocated prior to the communication session being initiated. The session identifier can then be activated to enable the session identifier to be used for routing data packets of a communication session.

20 Claims, 19 Drawing Sheets

Related U.S. Application Data continuation-in-part of application No. 14/750,787, filed on Jun. 25, 2015, now abandoned.

(56) References Cited

U.S. PATENT DOCUMENTS

| | | | | |
|---|---|---|---|---|
| 2006/0077963 | A1* | 4/2006 | Li | H04L 47/32 370/352 |
| 2006/0212576 | A1* | 9/2006 | Barkley | H04L 29/06 709/226 |
| 2008/0005056 | A1* | 1/2008 | Stelzig | H04L 65/1073 |
| 2008/0162742 | A1* | 7/2008 | Kong | H04L 67/145 710/19 |
| 2010/0250747 | A1* | 9/2010 | Karaoguz | H04L 47/824 709/226 |
| 2013/0111043 | A1* | 5/2013 | McGuire | H04L 47/18 709/228 |
| 2013/0138822 | A1* | 5/2013 | Hu | H04L 61/2589 709/227 |
| 2014/0226664 | A1* | 8/2014 | Chen | H04L 67/02 370/392 |
| 2015/0180822 | A1* | 6/2015 | Mathias | H04L 65/1069 709/206 |
| 2015/0271135 | A1* | 9/2015 | Tseng | H04L 61/2564 709/228 |
| 2016/0380789 | A1* | 12/2016 | Gunnalan | H04L 61/2007 709/228 |
| 2016/0380966 | A1* | 12/2016 | Gunnalan | H04L 61/2589 709/226 |
| 2016/0380967 | A1* | 12/2016 | Moore | H04L 61/2589 709/217 |
| 2017/0134357 | A1* | 5/2017 | Ohlsson | H04L 67/146 |
| 2017/0250859 | A1* | 8/2017 | Gheorghe | H04L 67/1004 |
| 2018/0131672 | A1* | 5/2018 | Ravindranath | H04L 61/2514 |
| 2018/0309716 | A1* | 10/2018 | Moore | H04L 65/60 |
| 2018/0309717 | A1* | 10/2018 | Moore | H04L 67/146 |

OTHER PUBLICATIONS

"International Preliminary Report on Patentability Issued in PCT Application No. PCT/US2016/039128", dated Sep. 8, 2017, 7 Pages.

"Office Action Issued in European Patent Application No. 16745228.3", dated Nov. 6, 2018, 5 Pages.

"Preinterview First Office Action Issued in U.S Appl. No. 16/017,992", dated May 14, 2020, 6 Pages.

"First Office Action and Search Report Issued in Chinese Patent Application No. 201680037441.6", dated Jun. 28, 2020, 10 Pages.

* cited by examiner

```
                                                               57R
                                                              ↙
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |      MTURN-IDENTIFIER         |            Length             |
    +-+-+-+-+-+-+-+-+-+-+-+-+-+-+-+-+-+-+-+-+-+-+-+-+-+-+-+-+-+-+-+-+
    |                                                               |
    |           MTURN Session ID(64 bits)                            |
    +-+-+-+-+-+-+-+-+-+-+-+-+-+-+-+-+-+-+-+-+-+-+-+-+-+-+-+-+-+-+-+-+
                                                        ⎬ 72
```

FIG. 9A

```
                                                                 60
                                                                ↙
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |        Channel-ID             |            Length             |
60h +-+-+-+-+-+-+-+-+-+-+-+-+-+-+-+-+-+-+-+-+-+-+-+-+-+-+-+-+-+-+-+-+
    |                                                               |
    |        Destination MTURN Session ID(64 bits)                  |
    +-+-+-+-+-+-+-+-+-+-+-+-+-+-+-+-+-+-+-+-+-+-+-+-+-+-+-+-+-+-+-+-+
60p |                                                               |
    |                      Data Variable                            |
    +-+-+-+-+-+-+-+-+-+-+-+-+-+-+-+-+-+-+-+-+-+-+-+-+-+-+-+-+-+-+-+-+
```

| MTURN Session Identifier | S1 | — 56(i) |
| MTURN Owner | X' (65.35.52.12:5000) | — 56(ii) |
| Active Destination Address | NULL | — 56(iii) |
| Active MTURN Session Identifier | NULL | — 56(iv) |

| MTURN Session Identifier | S1 | — 56(i) |
| MTURN Owner | X' (65.35.52.12:5000) | — 56(ii) |
| Active Destination Address | Y (95.12.32.43:3000) | — 56(iii) |
| Active MTURN Session Identifier | NULL | — 56(iv) |

| MTURN Session Identifier | S1 | — 56(i) |
| MTURN Owner | X' (65.35.52.12:5000) | — 56(ii) |
| Active Destination Address | MR2 (95.12.32.43:3479) | — 56(iii) |
| Active MTURN Session Identifier | S2 | — 56(iv) |

(56)

SESSION IDENTIFIER FOR A COMMUNICATION SESSION

RELATED APPLICATIONS

This application is a continuation of and claims priority to U.S. patent Ser. No. 15/061,485, filed on Mar. 4, 2016, entitled "Media Session", which is continuation-in-part of and claims priority under 35 U.S.C. § 120 to U.S. patent application Ser. No. 14/750,787, filed on Jun. 25, 2015, entitled "Media Relay Server", and U.S. patent application Ser. No. 14/750,802, filed on Jun. 25, 2015, entitled "Media Relay Server," the disclosures of which are incorporated by reference herein in their entirety.

BACKGROUND

A communication network may for example be a packet-based network and/or an internet. A network typically includes different types of network nodes, such as user devices, routers, network address translators (NATs), proxy servers, media relay servers etc., which perform different functions within the network. For instance, routers route packets between individual networks of an internet. NATs also perform such routing, as well as performing network address translation i.e. to mask the network address of the sender. Communication between two communicating nodes, such as user devices, may be via other nodes of the network, i.e. intermediate nodes such as routers, NATs and media relay servers. Every active network interface (e.g. of a user device, server etc.) connected to the network is assigned a network address, e.g. IP (Internet Protocol) address, so that is data can be routed thereto via the network. This may for example be assigned by an ISP (Internet Service Provider) in the case of a public network, or other network administrator.

A media session may be established between two endpoints, such as user devices, connected via a communication network so that real-time media can be transmitted and received between those endpoints via the network. The endpoints run client software to enable the media session to be established. The media session may be a Voice or Video over IP (VOIP) session, in which audio and/or video data of a call is transmitted and received between the endpoints in the VOIP session as media streams. Endpoints and other types of network node may be identified by a network address, such as an IP address. A transport address is formed of an IP address and a port number identifying a port associated with the IP address. A media session being may be established between transport addresses associated with the endpoints. An example of a media session is a SIP ("Session Initiation Protocol") media session. SIP signalling, e.g. to establish or terminate a call or other communication event, may be via one or more SIP (proxy) server(s). To this end, the SIP proxy forwards SIP requests (e.g. "INVITE", "ACK", "BYE") and SIP responses (e.g. "100 TRYING", "180 RINGING", "200 OK") between endpoints. In contrast to a media relay server, the media (audio/video) data itself does not flow via a basic SIP proxy i.e. the proxy handles only signalling, though it may in some cases be possible to combine proxy and media relay functionality in some cases. To establish the media session, one of the endpoints may transmit a media session request to the other endpoint. Herein, an endpoint that initiates a request for a media session (e.g. audio/video communications) is called an "initiating endpoint" or equivalently a "caller endpoint". An endpoint that receives and processes the communication request from the caller is called a "responding endpoint" or "callee endpoint". Each endpoint may have multiple associated transport addresses e.g. a local transport address, a transport address on the public side of a NAT, a transport address allocated on a relay server etc. During media session establishment, for each endpoint, a respective address may be selected for that endpoint to use to transmit and receive data in the media session. For example, the addresses may be selected in accordance with the ICE ("Interactive Connectivity Establishment") protocol. Once the media session is established, media can flow between those selected addresses of the different endpoints.

A known type of media relay server is a TURN (Traversal Using Relays around NAT) server, e.g. a TURN/STUN (Session Traversal Utilities for NAT) incorporating both TURN and STUN functionality. The network may have a layered architecture, whereby different logical layers provide different types of node-to-node communication services. Each layer is served by the layer immediately below that layer (other than the lowest layer) and provides services to the layer immediately above that layer (other than the highest layer). A media relay server is distinguished from lower-layer components such as routers and NATS in that it operates at the highest layer (application layer) of the network layers. The application layer provides process-to-process connectivity. For example, the TURN protocol may be implemented at the application layer to handle (e.g. generate, receive and/or process) TURN messages, each formed of a TURN header and a TURN payload containing e.g. media data for outputting to a user. The TURN messages are passed down to a transport layer below the network layer. At the transport layer, one or more transport layer protocols such as UDP (User Datagram Protocol), TCP (Transmission Control Protocol) are implemented to packetize a set of received TURN message(s) into one or more transport layer packets, each having a separate transport layer (e.g. TCP/UDP) header that is attached at the transport layer. The transport layer provides host-to-host (end-to-end) connectivity. Transport layer packets are, in turn are passed to an internet layer (network layer) below the transport layer. At the internet layer, an internet layer protocol such as IP is implemented to further packetize a set of received transport layer packet(s) into one or more internet layer (e.g. IP) packets, each having a separate network layer (e.g. IP) header that is attached at the internet layer. The internet layer provides packet routing between adjacent networks. Internet layer packets are, in turn, passed down to the lowest layer (link layer) for framing and transmission via the network. In the reverse direction, data received from the network is passed up to the IP layer, at which network layer (e.g. IP) headers are removed and the remaining network layer payload data, which constitutes one or more transport layer packets including transport layer header(s), is passed up to the transport layer. At the transport layer, transport layer (e.g. UDP/TCP) headers are removed, and the remaining payload data, which constitutes one or more TURN messages in this example, is passed up to the application layer for final processing, e.g. to output any media data contained in them to a user, or for the purposes of relaying the TUN message(s) onwards. This type of message flow is implemented at both endpoints and TURN servers i.e. endpoints and TURN servers operates at the application layer in this manner.

An IP address uniquely identifies a network interface of a network node within a network, e.g. within a public network such as the Internet or within a private network. There may be multiple application layer processes running in that node, and a transport address (IP address+port number) uniquely identifies an application layer process running on that node. That is, each process is assigned its own unique port. The port (or equivalently "socket") is a software entity to which messages for that process can be written so that they become available to that process. An IP address is used for routing at the internet layer by internet layer protocols (e.g. IP) and constitutes an internet layer network address that is included in the headers of internet layer packets, whereas the port number is used at the transport layer by transport layer protocols e.g. TCP/UDP to ensure that received data is passed to the correct application layer process. A transport layer packet includes a port number in the header, which identifies the process for which that packet is destined. In accordance with the TCP/IP Protocol Suite, a port number has a length of 16 bits. This means a maximum of $2^{16}-1=65535$ ports can be associated with a single IP address (as port 0 is reserved).

In contrast to media relay servers, routers typically only operate at the internet layer, routing IP packets based on IP addresses in IP packet headers. Notionally, NATs also only operate at the network layer and are distinguished from basic routers in that NATs modify IP headers during routing to mask the IP address of the source. However, increasingly NATs perform modifications at the transport layer, i.e. to transport layer packet headers, so at to also mask the source port number e.g. to provide one-to-many network address translation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A media session is established between a first endpoint and a second endpoint, by transmitting the following messages from the first endpoint in parallel:
  to the second endpoint, a message indicating a first server network address of a media relay server available to the first endpoint and comprising a unique session identifier;
  to the media relay server, an activation request comprising the unique session identifier. This activates the session identifier by causing it to be associated at the media relay server with a source address conveyed by the activation request.

Once the session identifier has been activated, a media packet received from the second endpoint at the first server network address that comprises the unique session identifier is relayed from the media relay server to the source address for receiving by the first endpoint.

BRIEF DESCRIPTION OF FIGURES

To aid understanding of the subject matter and to show how the same may be carried into effect, reference will now be made by way of example only to the following drawings in which:

FIG. 9A shows a possible format of a provisional allocation request;
FIG. 9B shows a possible format of an MTURN packet for carrying media data of a media stream;
FIGS. 11A, 11B, and 11C show how a media session data block in a database may be populated at various stages of a media session.

Figure 1:
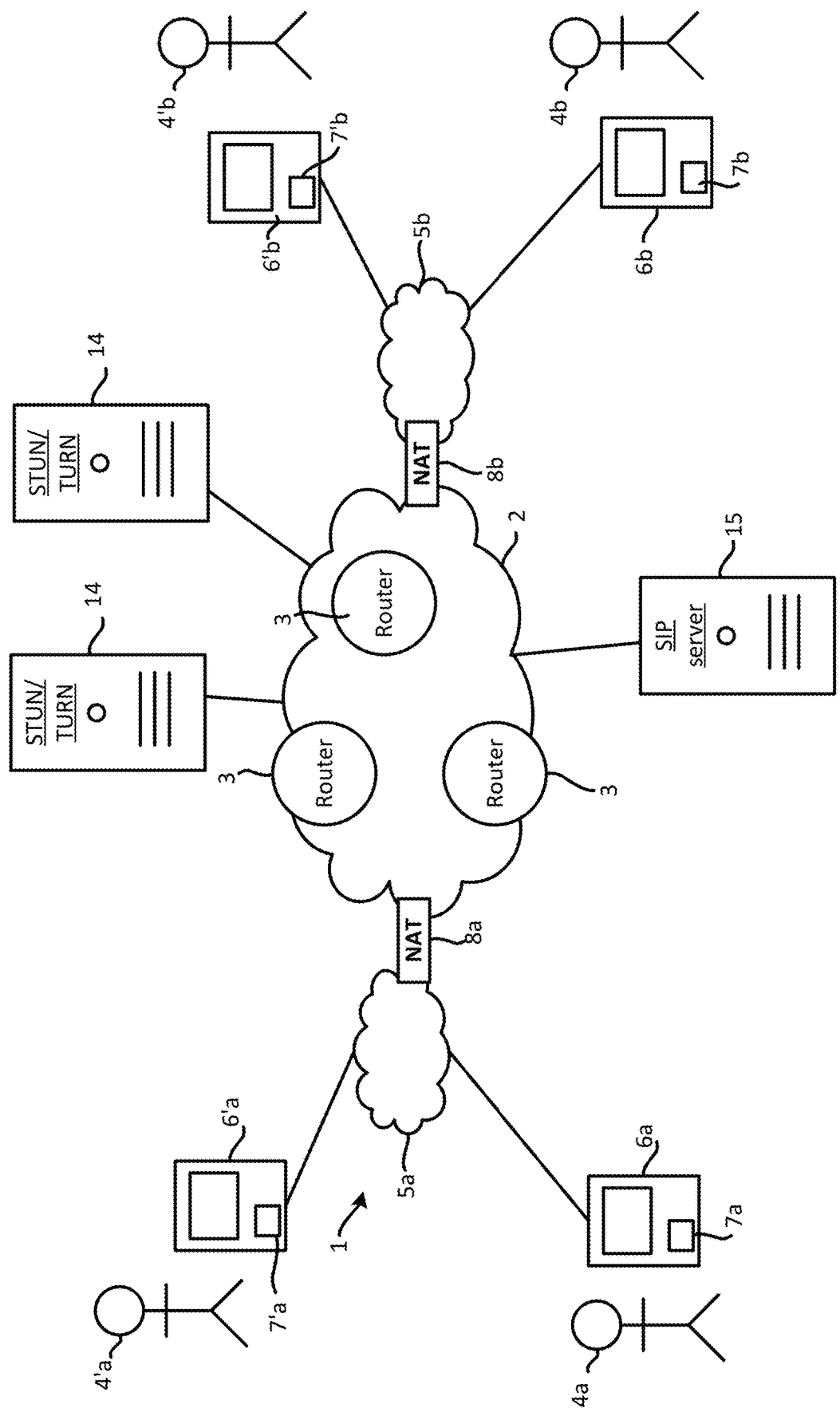
FIG. 1 shows a communication system.

Like reference signs denote corresponding features in the figures.

DETAILED DESCRIPTION OF EMBODIMENTS

As noted in the Summary section, herein, in establishing a media session between a first endpoint and a second endpoint, the first endpoint sends two messages in parallel: a message to the second endpoint which identifies, to the second endpoint, a media relay server that can receive a media packet comprising media data (audio and/or video data) on behalf of the first endpoint; and an activation request, to the media relay server, to activate the session identifier.

"In parallel" means the message to second endpoint is transmitted at substantially the same time as the activation request before any response to the activation request has been received at the first endpoint from the media relay server, and thus independently of the received response. In other words, a response to the activation request is received at the first endpoint from the media relay server after the message to the second endpoint has been sent. Accordingly the time interval between the time at which the message is transmitted to the second endpoint and the time at which the activation request is transmitted ($\Delta T1$ in FIG. 14) may be less than one roundtrip time between the first endpoint and the media relay server (e.g. RTT in FIG. 14).

The roundtrip time means the minimum time in which a single request-response exchange between the first endpoint and the media relays server can be completed (which may for example be of order seconds, hundreds of milliseconds, tens of milliseconds, or milliseconds).

The message to the second endpoint and the activation request are transmitted independently of each other's outcome. That is, the transmission of the message to the second endpoint is independent of the outcome of the transmission to the activation request and vice versa, e.g. the activation request may fail for some reason, but by this point the message will have already been sent. In the word case, a failed activation may lead to call set-up failing. However, through proper management of session identifiers on the media relay server (e.g. ensuring that they are not expired prematurely), the likelihood of failed activation can be minimized.

The unique session identifier (ID) in the message to the second endpoint has not been activated at the time the message is sent, i.e. at the time the message is sent, the session ID has not yet been associated at the media relay server with a network address to which the server can relay received media data for receiving by the first endpoint. The session identifier is only activated, i.e. associated with such a network address at the server, in parallel with the message itself by the activation request. The network address that is associated with the session identifier at the media relay server to activate it is determined by the server from the activation message itself, i.e. it is the source address conveyed by the activation message itself.

Because the session ID is activated in parallel with the sending of the message, the message can be sent instantly when desired. This is in contrast to activating the session ID before sending the message, which would require at least one round trip of initial messaging between the first endpoint and the server before the message can be sent.

In the described embodiments, the message is an "instant offer" or an "instant answer". That is, an offer message, wherein the offer message and the activation request are transmitted in direct response to a session instigation input received at the first endpoint (e.g. from a user of the first endpoint); or an answer message, wherein the answer message and the activation request are transmitted in direct response to an offer message received at the first endpoint from the second endpoint.

"Direct" in this context means that the candidate identification message is generated using only information that is already available at the first endpoint at the time the input or invite is received, or which can be obtained locally at the first endpoint (without communicating with the media relay server) at the time the instruction or invite is received. That is, such that no round trip messaging exchange takes place between the first endpoint and the server between the time the input/offer is received and the time the offer/answer to the second endpoint is transited. Accordingly, the time between the receiving of the user input/offer and the time at which the offer/answer is transmitted ($\Delta T2$ in FIG. 14) may also be less than one roundtrip time RTT between the first endpoint and the server. This reduces the time it takes to establish the media session i.e. the time between the receiving of the invite or offer and the time at which media data packets of the media session start to be received at the first endpoint from the second endpoint.

The message (offer/answer) is transmitted over SDP, for example via a suitable proxy server(s) or other proxying entity equipped to manage the signalling phase of the call establishment.

This is in contrast to existing systems based on the current ICE protocol, in which the first endpoint would, upon receiving such a user input or invite, have to first communicate with an available TURN/STUN server before it can send an offer or answer to the second endpoint respectively, in order to obtain the necessary relayed and/or server reflexive network candidate address(es)—see below—and can therefore not respond directly to the user input or offer. That is, in which at least one round trip between the first endpoint and the relay server is needed between receiving the user input or offer message, and the sending of the offer message or answer message respectively. In particular, in such systems, it would not be viable for the first endpoint to send an offer or answer without first communicating with the TURN server, because in accordance with the ICE protocol, this would require the first endpoint to be pre-allocated a unique port on the TURN server. As explained in further detail below, ports are a finite resource, and in at least some implementations, pre-allocating them is therefore not viable. In contrast, the present invention uses a session identifier, such can have a much larger address space, allowing multiple media streams to be multiplexed over the same port if necessary (see below).

What is more, activating in parallel (as opposed to pre-activating the session ID) ensures that the network address that is associated with the session ID at the media relay server is valid when the message is sent whilst minimizing the messaging overhead that is needed to keep it valid, thereby saving bandwidth. This effect is particularly acute in bandwidth-constrained networks, such as mobile networks.

In particular, if the first endpoint is behind a network address translator (NAT), the source address that is seen by the media relay server and therefore associated with the session ID will be a public address of the NAT that is not directly visible to the first endpoint itself, but which is mapped, at the NAT, to a private, local address of the first endpoint and therefore visible to the server. In practice, NATs only maintain this mapping for a limited duration of inactivity: if no data is sent or received to/from that public network address for a certain duration, the mapping at the NAT expires (i.e. times-out) such that the first endpoint can no longer be reached via that public address. This duration can be as short as a minute, or even less in some cases. Once the session ID has been activated, i.e. associated with this public address at the server, the mapping needs to remain alive. This means keeping it alive "artificially" if necessary, i.e. by periodically sending as many refresh messages via to/from this address as are needed to prevent timeout of the mapping. Because the session ID is only activated when the message to the second endpoint is sent, the time for which the mapping needs to be artificially maintained is minimized, and in some cases the need for refresh messaging is eliminated altogether (noting that, if and when the relay server begins forwarding media data packets to the public address based on its association with the session ID, refresh messages are no longer needed as the media packets themselves will keep the mapping alive).

In embodiments, the source address of the activation request may be a local network address of the first endpoint when transmitted by the first endpoint. However, the activation request may be transmitted via a first network address translator to which the first endpoint is connected, which generates a mapping between a public network address of the first network address translator and the local network address, and changes the source address of the activation request to the public network address such that the session identifier is associated with the public network address at the media relay server once activated. This, in turn, means that the media relay server will relay received media packets to that address of the network translator, from which the network address translator will route them to the first endpoint.

In the described embodiments, no "server reflexive" candidates are included in the message (i.e. in the instant offer or the instant answer). That is, the message transmitted to the second endpoint does not indicate any public network address of the first network address translator to which the first endpoint is connected. This ensures that (i) delays are not incurred by discovering such public addresses when the message is received (which would require at least one round trip of messaging between the first endpoint and an entity on the public side of the NAT, such as the media relay server, e.g. according to the STUN protocol) and (ii) no or minimal refresh messages are needed to keep such messages alive (any pre-cached public NAT address included in the message would need to need to be kept alive to be useful). Rather, in the embodiments described below, any such public NAT addresses are discovered entirely dynamically, i.e. exclusively by the endpoints themselves, as part of the media session establishment procedure, after the message (e.g. instant offer/answer) has been sent. Public NAT addresses discovered in this manner are referred to as "peer reflexive" candidates.

In the described embodiments, no reflexive candidates are exchanged between the endpoints over SDP at all, but are exclusively discovered as part of ICE connectivity checks.

Indeed, in the described embodiments, although the gathering and checking of reflexive candidates may be based on ICE-prescribed message formats and be based on the general principals of ICE, it deliberately contravenes the rules laid down in the ICE RFC protocol. In particular, in certain embodiments, at least the first endpoint performs connectivity checks for a host-peer reflexive candidate pair, i.e. by sending from the first endpoint to a dynamically-discovered, public NAT address of the second endpoint a probe message, which has as its source address a local (i.e. host) address of the first endpoint. This is contrary to what is laid down in the ICE RFC standard, which dictates that no connectivity checks for this type of candidate pair should not be performed. This standard-violating check provides a novel mechanism for opening up any necessary permissions on a first network address translator, behind which the first endpoint is located, such that the second endpoint can message the first endpoint directly thereafter. An example is described in further detail below, with reference to FIG. 16.

Terms like "server reflexive", "peer reflexive", "candidate" and "candidate pair" are well known in the context of the STUN/TURN/ICE protocols, and elaborated on below for reference. By contrast, the term "MTURN" refers to a novel adaptation of the TURN protocol to incorporate the session identifier, as explained in further detail below.

Further details of the instant offer/answer mechanism are given at towards the end of the Detailed Description. First, additional context around this novel "MTURN" concept is provided.

In the described embodiments, the unique session identifiers are used to provide port multiplexing, i.e. to enable multiple media streams to be relayed to multiple, different network endpoints via the same port of the media relay server simultaneously i.e. there is more than one receiving endpoint per port simultaneously.

The media relay server (which may for example be a TURN server) is for effecting communication events, for example voice and/or video calls, between endpoints of a network comprises a network interface, computer storage, a resource allocation module and a relay module. The network interface is assigned a server network address (e.g. IP address) and has a port associated with the server network address identified by a port identifier (e.g. a 16-bit port number).

The computer storage holds a port multiplexing database associated with the port. The resource allocation module is configured to: receive multiple allocation requests from the network, each allocation request indicating (e.g. comprising or otherwise making available to the media relay server) a different endpoint network address, and store each endpoint network address in association with a unique session identifier (ID)—for example having a size of 64-bits or more—in the database. The network address may, for example, be a network address that is local to a network interface of a network endpoint (e.g. user device), a network address on the public side of a NAT to which the network endpoint is connected, or even a network address on another media relay server which has allocated resources for use by the network endpoint (so that media is relayed via multiple relay servers) etc.

An input of the media relay server is configured to receive multiple media streams from the network via the port simultaneously, each stream being directed to the server network address and indicating (e.g. comprising or otherwise making available to the media relay server) the port identifier and a separate target session identifier i.e. separate from the port identifier.

The relay module is configured to, for each stream: determine the endpoint network address associated in the database with the target session identifier indicated by that stream, and transmit that stream to that endpoint network address. In this manner, multiple media streams are relayed to different network endpoints via the same port simultaneously.

As noted, some, though not all, embodiments implement what is referred to herein as "Multiplexed TURN" (MTURN), which refers to a modified version of the TURN protocols that incorporates the multiplexing of the present disclosure. In this context a session identifier is sometimes referred to as an "MTURN identifier".

A port is a software entity of the kind described above, and for the sake of disambiguation is sometimes referred to herein as a "physical port", in contrast to a session identifier which can be thought of as a "virtual port" identifier, with multiple virtual ports being provided by a single physical port.

This is in contrast to, say, existing TURN servers which allocate an individual port to each network endpoint i.e. so that a given port only relays a media stream to a single network endpoint at a time.

As will become apparent in view of the following, in various embodiments the unique session identifiers can:
1) Speed up gathering of TURN candidates;
2) Remove scalability limitations of TURN with removal of dependency on physical ports;
3) Enable packet flow from a peer without requiring explicit messages to enable permissions;
4) Enable roaming/mobility scenarios without significant impact to existing media sessions;
5) Serve as building blocks for enabling High Availability and Disaster Recovery (HA/DR) scenarios;
6) Provide a connectivity path for constrained networks where ICE connectivity checks may not be feasible.

In the context of TCP/IP, for existing TURN servers, which as indicated allocate an individual port to each requesting network endpoint, the number of network endpoints that can be served by a TURN server is limited to 65535 (≠64 k) per relay server IP address. As limitations go, this is less stringent than some, and for existing TURN server deployments other factors act to restrict the number of users that can be served by a TURN server simultaneously long before the 64 k limit is reached. This is because, in existing TURN deployments, for instance the various TURN servers that currently support the Microsoft® Lync® system, allocated ports have high bandwidth requirements. Thus bandwidth availability acts to restrict the number of users that can be served by a TURN server to significantly less than 64 k, long before the TURN server runs out of ports.

However, in developing novel deployments, the inventors have recognized situations in which, contrary to conventional wisdom, the 64 k port limit would expected to become a limiting factor following existing TURN methodologies.

For example, one novel use case which the inventors have developed is the use of a media relay server to provide clients with backup media paths. That is, the inventors have recognized that it is possible to make available resources on a media relay server to clients, which each client is configured to use only if a primary i.e. "first-choice" route(s) through the network for the media session fails. Because the client is configured in this manner, it can be safely assumed that no more than a certain fraction of clients to which TURN server resources have been notionally allocated will actually use these resources at any one time, as they are only used as a backup. Thus resources can be allocated to a large number of clients such that, if all of those clients attempted to use them at once to establish media sessions via the TURN server, an available bandwidth of the TURN server would be exceeded, on the safe assumption that at least some (and possibly many) will not do so because they are able to establish the media session via (one of) their preferred route(s) instead.

In embodiments in which a call is set up using the ICE protocols, this may for example be effected through the addition of a new multiplexed relayed candidate, comprising the server IP and address, port number and separate session identifier, and assigning this new type of candidate a lower priority than other candidates so that the other candidates are favoured where possible.

The inventors have recognized that, in the case where the probability of success using a preferred path is high, it is viable to allocate back up paths via the media relay server to (potentially significantly) more that 64 k users (though only a small number will actually be consuming the available bandwidth by using the allocated paths for media flow). Multiplexing media sessions over single ports in the above manner, i.e. so that multiple network endpoints share a single port simultaneously, ensures that the 64 k limit does not limit the extent to which backup resources can be allocated on the server. For example, in some cases a single port may be associated with tens, hundreds, thousands, tens of thousands or even hundreds of thousands of users simultaneously in the data base simultaneously (though only a few of these users may actually be making use of their allocation).

In some embodiments, only a single port on the relay server may be used for media relaying i.e. so that all media streams which are relayed via that server are relayed via the single port. In other embodiments, a single respective port may be used for each media modality—e.g. a first port for audio, a second single port for video. That is, all audio streams directed to the server network address may be relayed via a first of multiple ports and all video streams directed to the server network address may be relayed via a second of the multiple ports. Thus all audio (resp. video) that is relayed via that server is replayed via the first (resp. second) port. In either case, a media streams may be relayed to a potentially large number of network endpoints via the same port simultaneously e.g. at least 10, 100, 1000 or even 10,000 different networks endpoints. A third single port may also be provided for the relaying of any other type of data if desired.

The port multiplexing of the present disclosure also enables call set up times to be reduced in various embodiments, as compared with existing TURN servers, for the following reasons.

In order to allocate resources on an existing TURN server, a port must be individually assigned to a requesting client as discussed. Because of the 64 k port limit, a port is a sufficiently finite resource, i.e. a port is valuable enough, that it cannot be safely allocated to the requesting client without first authenticating the requesting client. Authentication takes place for instance through the exchange of credentials between the client and the server, and invariably requires several request-response message exchanges to take place via the network. As call set-up cannot proceed until the client has its individual port assignment, these potentially length exchanges can significantly delay call setup.

This can be avoided by using session identifiers that have a bit length (significantly) greater than that of a port number—for example a 64-bit or GUID ("Globally Unique Identifier", generally having a size ≥128-bit) session identifier can be used, though in some circumstances smaller identifiers may be sufficient depending on e.g. the size of the user base. A long session identifier can be safely allocated to a requesting client without having to authenticate the requesting client first. As such, the allocation may take no more than a single request-response exchange, after which call set up can proceed without further delay. Authentication can then take place in parallel with call setup, without delaying it further (unless of course authentication fails). For example, call setup can proceed by the client sent an ICE "Initial Offer" (caller client) or ICE "Answer" (callee client) which includes the session identifier.

Even if authentication does reveal that the requesting client has requested the session identifier to nefarious ends, this is not an issue at the point at which the session identifier is issued: session identifiers are not valuable in the way that ports are and the session identifier is not actually useable until authentication has completed successfully, so issuing the session identifier before authentication poses no additional risk. Thus, the use of session identifiers can reduce call-set-up time without compromising security in any way.

FIG. 1 is a schematic illustration of a communication system, which comprises: a public network 2; first and second endpoints, which are first and second user devices 6a, 6b operated by first and second users 4a, 4b; third and fourth endpoints, which are third and fourth user devices 6'a, 6'b operated by third and fourth users 4'a, 4'b; one or more media relay servers 14 (two are shown by way of example); and one or more proxy servers (one is shown by way of example), such as SIP server(s) 15.

The public network 2 is a public, packet-based internet (that is, a system of interconnected individual networks) e.g. the Internet, having a public address space. The public network 2 comprises a plurality of routers 3 which route traffic between different individual networks (not shown) of the public internet 2.

The user devices 6a, 6'a are connected to, and are network nodes of, a first packed-based private network 5a and the user devices 6'a, 6'b are connected to, and are network nodes of, a second packet-based private network 5b.

Each node of a private network has a respective private network address in a private address space of that private network which other nodes connected to that same private network (and only such nodes) can use to communicate with that node over that private network (and only over that private network). That address is private in that it cannot be used to communicate with that node by devices which are not connected to that same private network e.g. it cannot be used within the public network 2. Moreover, whilst that address is unique within that private network, other nodes may use the same network address within different networks (e.g. the first and second user devices 5a, 5b might happen to have the same private network address but which is useable to communicate with the first user device 6a only within the first private network 5a and which is useable to communicate with the second user device 6b only within the second private network 5b).

To enable nodes of the first and second private networks 5a, 5b to communicate with the public network 2, they are connected to the public network 2 via a first and a second Network Address Translator (NAT) 8a, 8b respectively. Each NATs 5a, 5b has both a respective private network addresses in the applicable private address space (referred to as an address on the private side of that NAT) and a respective public network address in the public address space of the public network 2 (referred to as an address on the public side of that NAT). Thus, not only can nodes of the first and second private networks 5a,5b communicate with the first and second NATs 5a, 5b respectively using those NATs' private network addresses, but nodes outside of that private network can communicate with those NATs 5a, 5b using those NATs' public network addresses.

A NAT (e.g. 8a, 8b) operates as an interface between a private network (e.g. 5a, 5b) and public network (e.g. 2) by mapping the private address space of the private network into the public address space of the public network, thereby enabling nodes of the private network to communicate outside of the private network over the public network. Nodes outside of one of the private networks (5a/5b) can direct traffic intended for a particular node of that private network to the relevant NAT (8a/8b) via the public network 2 using that NATs public address, which that NAT then forwards the traffic to that node via that private network. The operation of a NAT is described in detail below.

The private networks 5a, 5b and public network 2 and constitute a communication network 1, of which the various user devices 6a, . . . , 6'b, NATs 8a, 8b, servers 12, 14a, 14b and routers 3 are network nodes. The communication network 1 is also an internet (which comprises the individual networks of the internet 2 as well as the private networks 5a, 5b).

The user devices 6a, 6b run respective instances of communication client software 7a, 7b (client). The client enables the user devices 6a, 6b to establish media sessions between the user devices 6a, 6b over the network 1, for example to facilitate a real-time communication event (e.g. a voice and/or video call) between the user's 4a, 4b so that the users 4a, 4b can communicate with one another over the network 1, with call audio and/or video being transmitted and received between the devices 6a, 6b in the media session. The communication is "real-time" in the sense in that there is only a short delay, for instance about 2 second or less, between audio/video being captured at a near-end device and received and outputted by the far-end device. The user devices 6'a, 6'b also run respective instances of the client software 7'a, 7'b to similar effect. The client may for example be a stand-alone application that is executed on a processor of the relevant user device, or a plugin to another application executed on the processor such as a Web browser.

Figure 2:
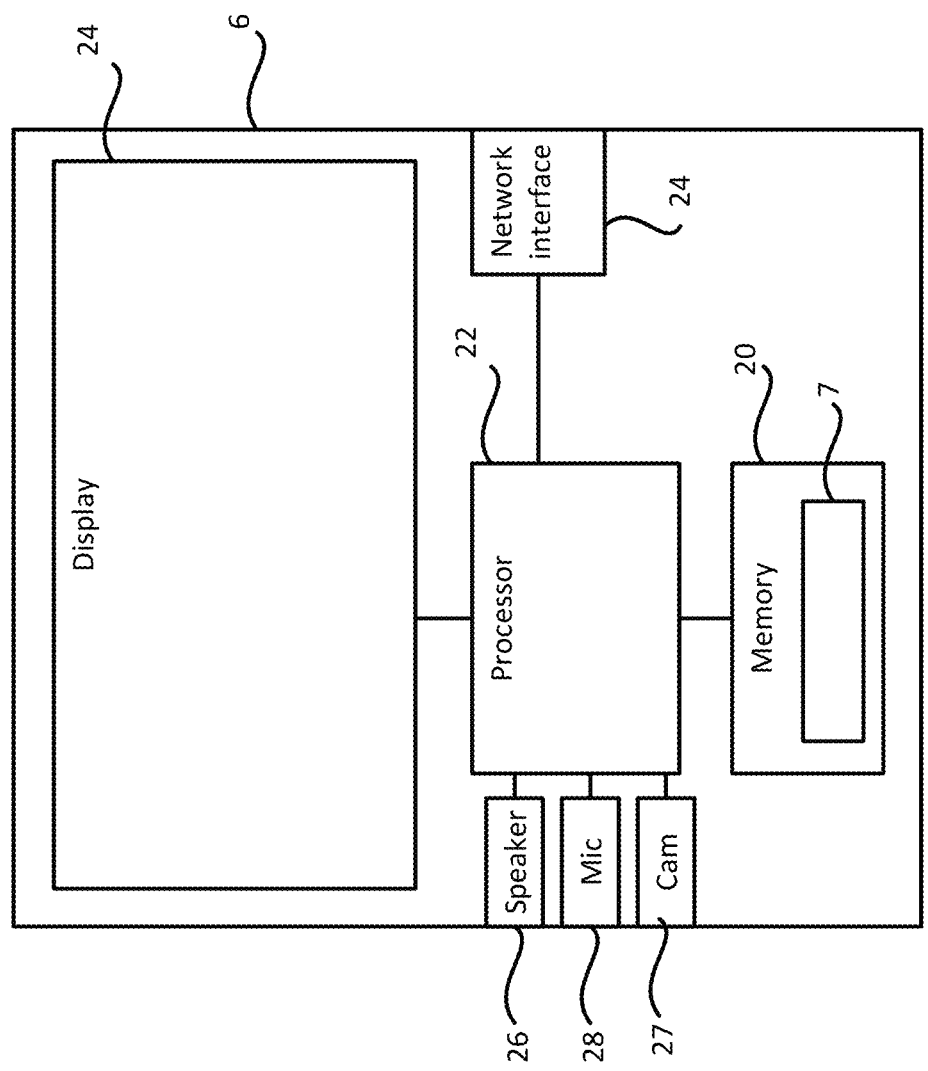
FIG. 2 shows a block diagram of a user device.

Alternatively or in addition, a user device may connect to the public network 2 by some other mechanism which does not involve any NATs though this is not shown in FIG. 2. For example, a user device may be connected via a Wi-Fi connection to a private network and to a public network via a mobile network with no NATs involved.

Figure 1A:
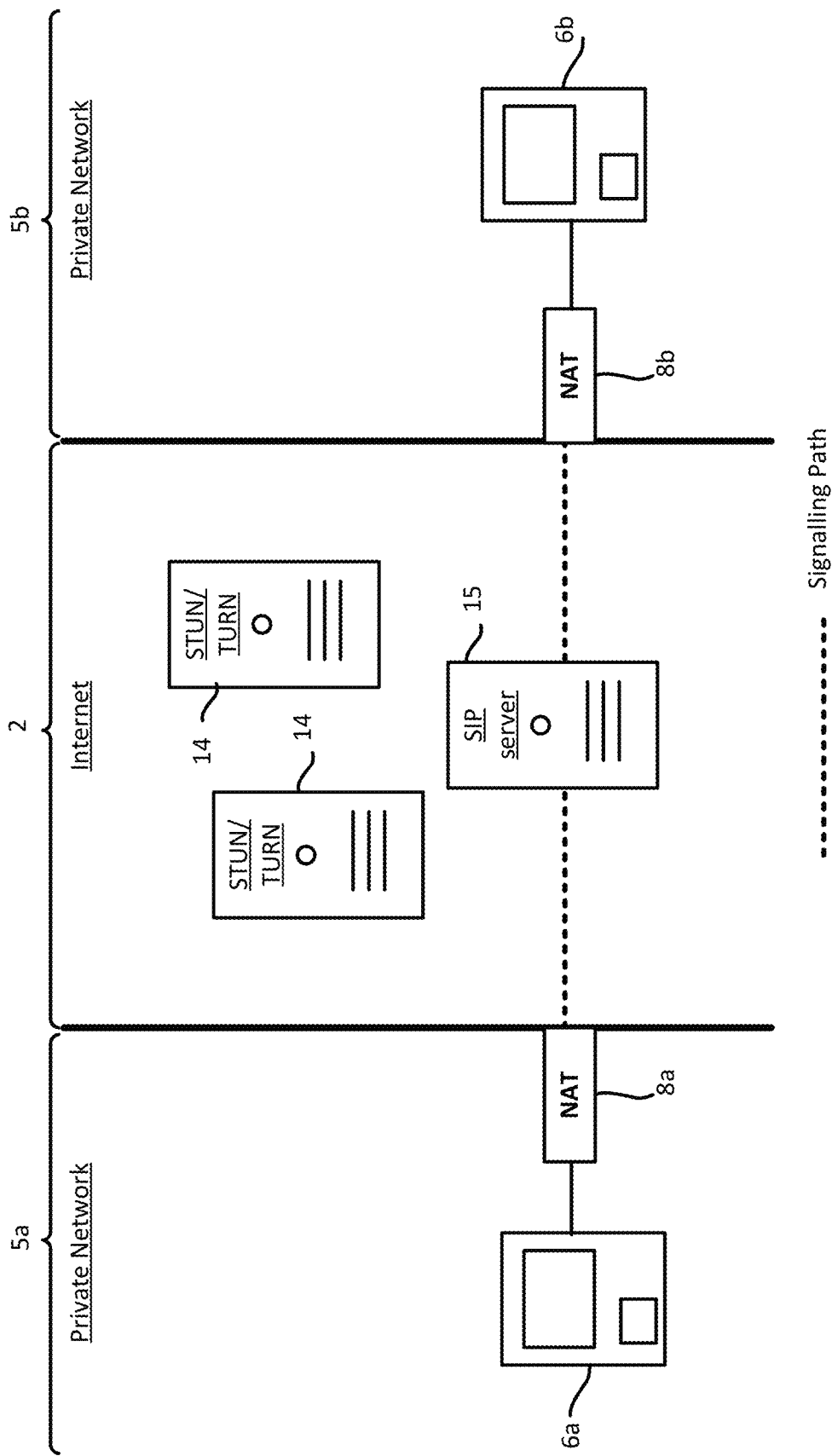
FIG. 1A shows a TURN deployment scenario.

FIG. 1A shows an exemplary signalling path (represented as a dotted line) for call signalling (not media flow). The signalling is between user devices 6a, 6b via an SIP proxy 15, and represents an exchange of SIP request-SIP response messages that results in a call or other communication event being established, terminated, modified etc. Once established, media stream(s) of the call can flow between the user devices 6a, 6b for example via one or more media relay servers 14, or "directly" via a route through the network 2 that does not involve any application layer intermediaries i.e. only lower-layer intermediaries such as routers 3 and NATs 8.

FIG. 2 is a schematic block diagram of a user device 6 (e.g. 6a, 6b, 6'a, 6'b). The user device 6 is a computer device which can take a number of forms e.g. that of a desktop or laptop computer, mobile phone (e.g. smartphone), tablet computing device, wearable computing device, television (e.g. smart TV), set-top box, gaming console etc. The user device 6 comprises a processor 22 to which is connected memory 20, one or more output devices, such as a display 24 and loudspeaker(s) 26, one or more input devices, such as a camera 27 and microphone 28, and a network interface 24, such as an Ethernet, Wi-Fi or mobile network (e.g. 3G, LTE etc.) interface which enables the user device 6 to connect to the network 1. The display 24 may comprise a touchscreen which can receive touch input from a user of the device 6, in which case the display 24 is also an input device of the user device 6. Any of the various components shown connected to the processor may be integrated in the user device 6, or non-integrated and connected to the processor 22 via a suitable external interface (wired e.g. Ethernet, USB, FireWire etc. or wireless e.g. Wi-Fi, Bluetooth, NFC etc.). The memory 20 holds a copy of the client 7 which, when executed on the processor 24, causes the user device 6 to implement the functionality of the client 7. The client 7 has a user interface for receiving information from and outputting information to a user of the user device 6, including during a communication event such as a call.

The user interface may comprise, for example, a Graphical User Interface (GUI) which outputs information via the display 24 and/or a Natural User Interface (NUI) which enables the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Figure 3:
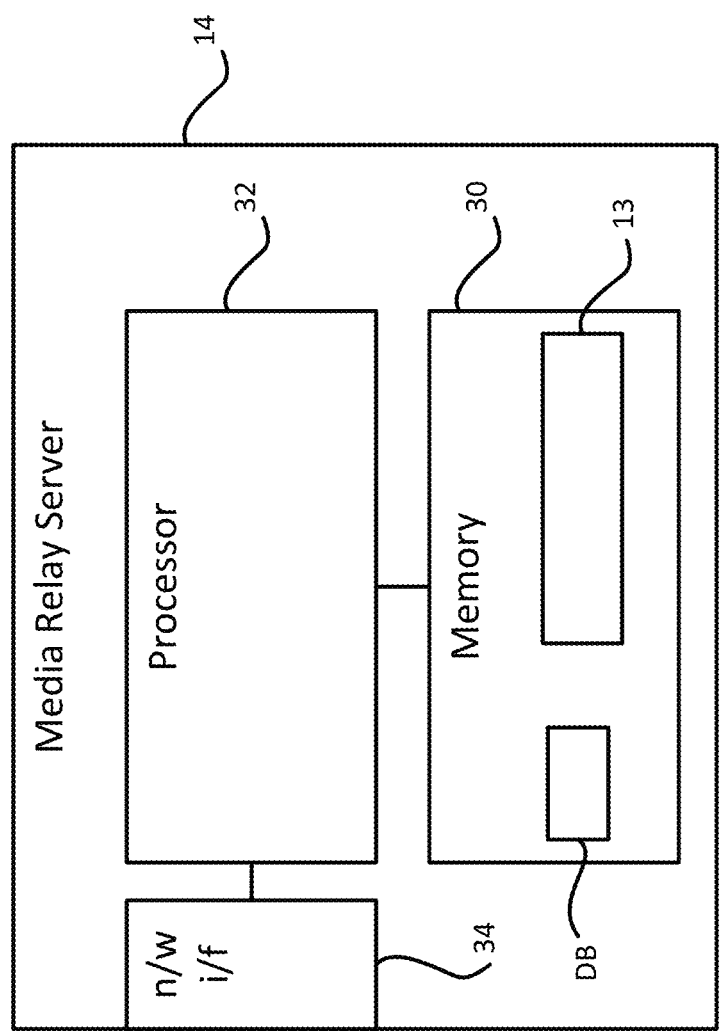
FIG. 3 shows a block diagram of a media relay server.

FIG. 3 is a schematic block diagram of a media relay server 14. The relay server 14 comprises a processor 32 to which is connected memory 30, and a network interface 34 which enables the relay server 12 to connect to the network 1. The memory 30 holds control software 13 which, when executed on the processor 32, causes the relay server 14 to implement the functionality of the control software 13. Although depicted as a single device, the functionality of the relay server 12 may be distributed across multiple devices, for example multiple server devices in a datacentre.

The network 1 has a layered architecture, whereby the functionality of the network 1 is organized into abstracted layers. This is illustrated schematically in FIG. 4. In this example, the network 1 implements the Internet protocol suite, whereby the functionality is organized into four layers 108-102: an application layer 108 (comparable to a combination of layers 5, 6 and 7 of the OSI ("Open Systems Interconnection") model), a transport layer 106 (comparable to layer 4 of the OSI model) below the application layer 108, a network layer 104 (comparable to layer 3 of the OSI model)—which is an internet layer—below the transport layer 106, and a link layer 102 (comparable to a combination of layers 1 and 2 of the OSI model) below the internet layer 104. The application layer 108 provides process-to-process communication between processes running on different hosts i.e. general purpose computer devices connected to the network 1 such as user devices 6 and servers 12, 14 (note that routers 3 and NATs 8 are not "hosts" as the term is used herein). The transport layer 106 provides end-to-end communication between different hosts, including providing end-to-end channel(s) between hosts for use by the processes. The internet layer 104 provides routing i.e. communication between different individual networks of the internet 1, e.g. via routers 3/NATs 8 which operate at the internet layer, with the latter providing translation of network address information at the internet and transport layers (network address translation). The link layer 102 provides communication between physical network addresses—for instance, MAC ("Medium Access Control") addresses—of adjacent nodes in same individual network the internet 1 e.g. via network switches and/or hubs etc. which operate at the link layer 102.

Application layer data 17 (application data, e.g. user data) to be transmitted over the network 1 is passed at a transmitting host from the application layer 108 to the transport layer 106, at which it is packetized into transport layer packet(s) in accordance with a transport layer protocol such as UDP ("User Datagram Protocol") or TCP ("Transmission Control Protocol"). TCP is a "reliable" stream delivery service in that it involves acknowledgment/retransmission mechanisms whereas UDP is an "unreliable" stream delivery service in that it does not involve any such mechanisms. Packets of unreliable services are called datagrams. The data of the transport layer packet(s) (e.g. TCP packet(s)/UDP datagram(s)) are then passed to the internet layer 104 at that host, at which the data is further packetized into IP datagram(s) in accordance with the Internet Protocol (which is an internet layer protocol). The data of the IP datagram(s) are then passed to the link layer 102 for transmission over the network 1 to a receiving host. When received at the receiving host, the data of the IP datagram(s) is passed up to the internet layer 104, at which the data of the transpor layer packet(s) is extracted from the payload(s) of the IP datagram(s) and passed up to the transport layer 106, at which the application data is extracted from the payload(s) of the transport layer packet(s) and passed up to the application layer.

Figure 4:
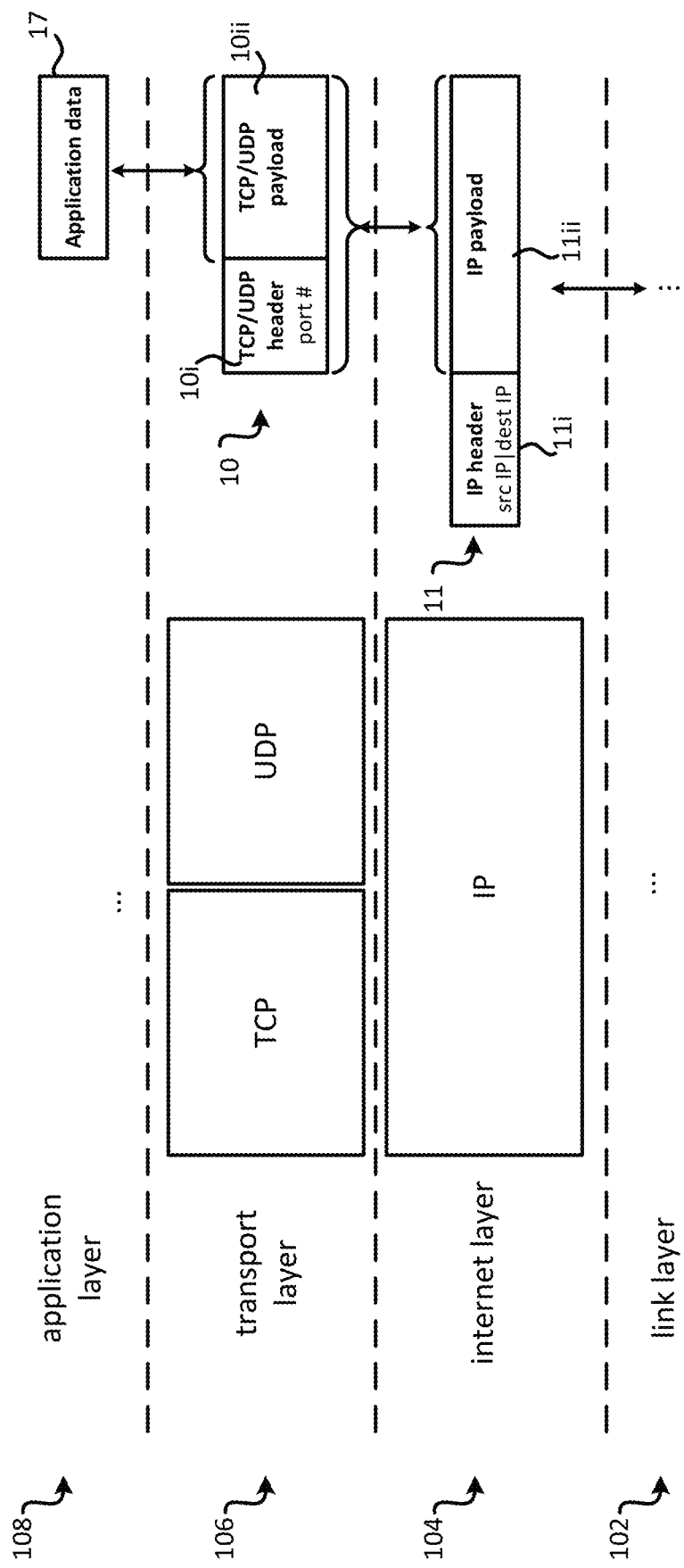
FIG. 4 shows a representation of a layered network architecture.

A transport layer packet (e.g. TCP packet or UDP datagram) 10 is illustrated in FIG. 4. The Transport layer packet 106 comprises a transport layer header (e.g. UDP/TCP header) 10*i*—which is generated and attached at the transport layer 106 of the transmitting host—and transport layer payload (e.g. UDP/TCP payload) 10*ii*—which encodes application data received from the Application layer 108.

An IP datagram 11 is also illustrated. The IP datagram 11 comprises an IP header 11*i*, which is generated and attached at the internet layer 104 of the transmitting host, and an IP payload 11*ii*, which encodes the data of the transport layer packet(s) received from the transport layer. The IP header comprises a destination transport address, which is a transport address to which the IP packet 11 is directed through the network 1, and a source transport address, which is a transport address local to the host (at least at this stage of packet generation) which generates the IP datagram.

For packets generated within a private network (e.g. 5*a*/5*b*), the IP header 11*i* includes a source IP address which is a private network address in the private address space of that private network (e.g. private network address of user device 6*a*/6*b* in 5*a*/5*b*). The UDP/TCP header(s) 10*i* contained in one or more such IP packet payloads 11*i* includes a port number of a port associated with that private address. The IP address and port number constitute a transport address.

As indicated, such a private address space is not useable outside of that private network. As such, were a simple router used to forward IP datagrams between that private network (e.g. 5*a*/5*b*) and a public network (e.g. 2), nodes outside of that private network would be unable to respond to such datagrams as they would not have any useable source address in the IP header.

To this end, a NAT 8 may be used to provide an interface between a public and private network.

Figure 5:
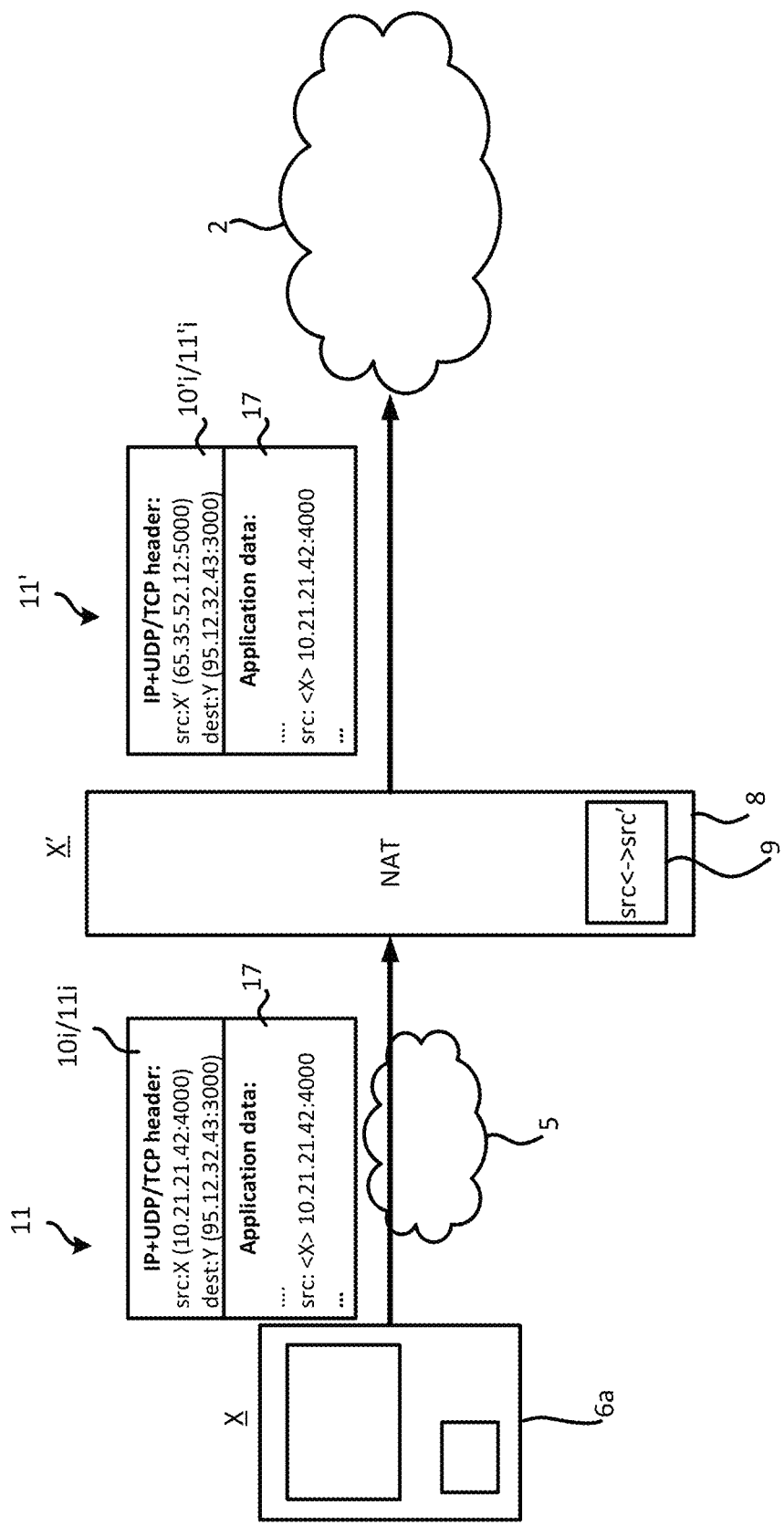
FIG. 5 illustrates operation of a Network Address Translator.

FIG. 5 illustrates the operation of a NAT 8 (e.g. 8*a*, 8*b*). IP datagrams 11 are received by the NAT via a private network 5 (e.g. 5*a*, 5*b*) from a node of that network such as a user device 6 (e.g. 6*a*/6'*a*, 6*b*/6'*b*). The IP and TCP/UDP headers 11*i*, 10*i* convey an initial source transport address of the user device 6, which comprises a private network address (which is a private IP address) of the user device 6 in the private address space of the private network 5 and a port associated with that private address. The IP and UDP/TCP headers 11*i*, 10*i* also convey a destination transport address to which the IP datagram 11 has been directed by the user device 6.

As shown, for each IP datagram, the NAT 8 modifies the IP and TCP/UDP headers 11*i*, 10*i* to replace the initial source transport address with a new source transport address, thereby generating a modified IP datagram 11' with modified IP and TCP/UDP headers 11'*i*, 10'*i* conveying the new source transport address. The destination transport address and application data 17 are unmodified by the NAT 8. The new transport address is formed by a public network address (which is a public IP address) of the NAT 8 in the public address space of the public network 2, and a port associated with that public IP address.

The NAT 8 maintains a mapping 9 between the initial transport address and the new transport address so that it can forward any return traffic that has been directed to the new transport address via the public network 2 (and which will thus end up at the NAT 8) to the initial transport address of the user device 6 via the private network 5. In the simplest example, the NAT simply replaces the private IP address with its own public IP network address and does not alter the port. However, it is becoming increasingly common for NATs to implement address space masquerading, whereby the private address space is hidden behind a single network address. To prevent ambiguity in return packets, the NAT generally has to alter other information such as the port associated with the source address. For instance, a NAT may have a single public IP address and replace every transport address in the private address space with its own single public IP address and a unique (and likely different) port so that outside of the private network nodes of the private network are distinguished from one another only by ports associated with that single public IP address.

This is generally acceptable for protocols (such as HTTP) which simply direct responses to the source address in the IP header.

However, other protocols including some media session signalling protocols (such as SIP) also rely on address of endpoints encoded in the application data 17 itself. For example, the SIP protocol dictates that endpoints should use addresses which are contained in an SIP invite/SIP response to establish the media session, which will be encoded at the application data level. As illustrates in FIG. 5, this is not modified by the NAT 8.

Thus, for example, suppose the first user device 6a in FIG. 1 were to transmit application data 17 constituting a media session invite to the second user device 6b via the first NAT 8a. That NAT 8a would not modify the application data 17 thus, having received the invite, the second user device 6b would attempt to respond to the invite using the unmodified private transport of the first user device 6a from the unmodified application data 17—this would fail as that private address is not useable outside of the private network 5a, and it would therefore not be possible to establish the session. Similarly, even if the first user device 6a were not behind the NAT 8a and instead had its own public IP address, the session establishment would still fail as the second user device 5b is behind the NAT 5b: in responding to the invite with a session invite response, the second user device 6b would include its own private address in the second address space of the second private network 5b in the response encoded at the application data level, which is similarly not useable by the first user device 6a.

To this end, protocols such as STUN ("Session Traversal Utilities for NAT") and TURN ("Traversal Using Relay NAT") have been developed to enable SIP sessions and the like to be established between endpoints which are separated by one or more NATs.

STUN allows an endpoint to determine whether or not it is located behind a NAT and, if so, the public address of the NAT which is mapped to the private address of the initiating endpoint (i.e. effectively giving it access to the mapping 9) so that the endpoint may include that public address in the IP payload(s) rather than its own private address. Typically, STUN works by the initiating endpoint sending a query to a STUN server, which is relayed to the STUN server through the NAT and via the public network as IP datagram(s). Because the NAT replaces the private address in the IP header(s) of the query with the corresponding public address on the public side of the NAT, the STUN server can obtain the latter from the IP header(s) of the query, which it can, in turn, provide to the initiating endpoint. The initiating endpoint can then establish the session using that public address rather than its own private address, thereby conveying a useable address at the IP payload level to the responding endpoint in the session request. The responding endpoint can similarly discover its associated public address which it can convey to the initiating endpoint at the application data level in the response rather than its own private address. The role of the STUN server is effectively one of providing address discovery, and generally it does not participate in the media session once established.

As is known in the art, there are circumstances in which such a session cannot be established even when the public address of the NAT is known, for instance when the initiating and/or responding endpoint is behind a symmetric NAT. In such circumstances, one or more TURN relay servers can often be used to traverse the NAT by relaying media data through the TURN server(s).

When an endpoint needs to use a conventional TURN relay, it sends a request to the TURN relay requesting that a unique public transport address, i.e. an individual port, on the TURN relay be allocated to the endpoint. If the request is accepted, the media session is then established using that public address of the TURN server as the source address for that endpoint. That endpoint sends to the TURN server media that it wishes to transmit in the session contained in TURN messages. The TURN server extracts the media from the TURN messages, and relays it onwards from the public address on the TURN server which has been allocated to that endpoint as a source address. The TURN server also relays data intended for that endpoint which has been directed to the address allocated on the TURN server to that endpoint contained in TURN messages for extraction by that endpoint.

If both endpoints are located behind NATs that do not permit STUN, then each will need its own respective transport address to be allocated on a TURN server, in which case the media session is established between those two allocated TURN server addresses and each endpoint relays/receives data in TURN messages, with data provided to the TURN servers being transmitted and received to/from the two TURN server addresses allocated to those endpoints in the media session.

TURN relaying requires resources—including the unique public transport address(es) allocated on the TURN server(s)—to be allocated on that (those) server(s) for at least the duration that media session, and also means that media of the media session travels via a less direct path than when a media session is established directly between the endpoints or via one or more NATs. Though it does require additional resources, TURN relaying can more or less guarantee to provide a useable path through a network for a media session.

STUN and TURN functionality can be incorporated in the same server, which is sometimes also referred simply to as a TURN/STUN server or simply as a TURN server even though it also includes STUN functionality.

The media servers 14 of FIG. 1 are TURN servers, which incorporate at least TURN functionality and thus have both address lookup and media relay functionality. Alternatively, this and/or other functionality may be split between separate servers, or the functions performed by the media servers 14a, 14b described below may be performed by the same server.

ICE ("Interactive Connectivity Establishment") is a known protocol that is used for establishing connectivity for VOIP sessions traversing network address NATs and firewalls, which attempts to establish the most efficient path in terms of media latency to ensure ideal media quality. Details of the ICE protocol can be found in the publically available RFC 5245, Interactive Connectivity Establishment (ICE): A Protocol for Network Address Translator (NAT) Traversal for Offer/Answer Protocols, J. Rosenberg (April 2010). Certain extensions to the ICE protocol are defined in [MS-ICE2] Interactive Connectivity Establishment (ICE) Extensions documentation (http://msdn.microsoft.com/en-us/library/office/cc431504(v=office.12).aspx).

In the context of ICE, a direct path, i.e. not involving any TURN relaying, between clients is preferred for a media session over an indirect path e.g. that involves using intermediate relay servers (e.g. relaying through TURN server(s)). A path is identified by a pair of transport addresses—one of which is used to transmit and receive data by an initiating endpoint and the other to transmit and receive data by a responding endpoint.

The ICE protocol attempts to identify what it deems to be the most efficient path based on static priorities, which are assigned to each of a number of so-called "candidate pairs" that could be used for the media session. A candidate is a transport address associated either an initiating endpoint or a responding endpoint. A candidate pair is a pair of candidates (i,r), the first (i) associated with the initiating endpoint and the second (r) with the responding endpoint. The term "candidate" relates to the fact that the ICE mechanism initially assumes that any transport address associated with an endpoint might be useable for a media session (though it may not actually be useable for reasons discussed above)—the ICE protocol then involves detecting which of the identifying candidate(s) are actually useable.

ICE classes candidates into 3 categories: host candidates, reflexive candidates and relayed candidates.

A host candidate is a transport address which is local to the endpoint in question i.e. on a network interface directly attached to the endpoint. For example, the private addresses of the user devices 6a, 6b are local to those user devices and are thus host candidates, and similarly if the user devices were directly connected to the public network 2 (rather than or in addition to via the NATS 8a, 8b) they would have their own public addresses local to those user devices which would also be host addresses.

A reflexive candidate is a transport address which is not local to an endpoint, but which is a translated transport address on the public side of a NAT (e.g. as included in the modified IP header 11′i of FIG. 5). These are classed into two sub categories: "server reflexive candidates" which are public NAT addresses discovered by querying a server e.g. STUN server in the manner outlined above, and "peer reflexive candidates" which are discovered by the other endpoint during the establishment of the media session (e.g. a public side NAT address associated with the initiating endpoint as discovered by the responding endpoint, or vice versa).

A relayed candidate is a transport addresses allocated from a media relay server e.g. TURN server in the manner outlined above.

Potentially, any of the initiating endpoint's candidate transport addresses can be used to communicate with any of the responding endpoint's candidate transport addresses. That is, the first user device 6a can potentially direct data from any of its own associated addresses to any of the addresses associated with the second user device and vice versa.

However, in practice, some candidate pairs will not be valid (i.e. will not work). For instance, if the endpoints are both behind NATs and their host candidates are private addresses in the private networks 5a/5b, they are unlikely to be able to communicate directly using those addresses for the reasons discussed above. However, if their host candidates are public addresses which, when used, do not involve routing data through any NATs then the candidate pair (40a, 40b) may well be valid. Similarly depending on the type of NATs (e.g. if it is a symmetric NAT), use of reflexive candidates may not be possible as discussed.

Each candidate pair thus potentially represents a path through the network of a certain type, although such a path will only be available in practice if the candidate pair is actually valid.

The order in which candidate pairs are tried is dictated by the ICE static priority scheme, with higher priority pairs being tried ahead of lower priority pairs. In accordance with the ICE protocol, each candidate (e.g. 40a-44b) can be assigned a static priority in accordance with equation 1:

The type preference is an integer from 0 to 126 inclusive, and represents the preference for the type of the candidate (local, server reflexive, peer reflexive, and relayed). 126 is the highest preference, and a 0 is the lowest. Setting the value to a 0 means that candidates of this type will only be used as a last resort. The type preference is identical for all candidates of the same type and is different for candidates of different types. The type preference for peer reflexive candidates is higher than that of server reflexive candidates. The ICE protocol recommends values of 126 for host candidates (unless these are from a Virtual Private Network interface, in which case 0 is recommended), 100 for server reflexive candidates, 110 for peer reflexive candidates, and 0 for relayed candidates. The local preference is an integer from 0 to 65535 inclusive and represents a preference for the particular IP address from which the candidate was obtained when an endpoint is multihomed (connected to more than one computer network). When there is only a single IP address, ICE recommends setting this to the maximum of 65535, effectively making this term redundant when there is no multihoming. The component ID term is an identifier of the candidate. As can be seen, by far the most significant term in equation 1 is the first term which is based on the candidate type. Thus the ICE priority scheme deprioritizes indirect paths via relayed candidates, which it uses only as a last resort, and moreover biases the static priorities away from reflexive candidates. Once the candidate pairs are formed and priorities assigned in accordance with equation (1), candidate pair static priorities for each candidate pair can be calculated in accordance with equation 2:

where G is the static priority for the initiating endpoint's candidate, D that for the responding endpoint's candidate, and G>D?1:0 an expression whose value is 1 if G is greater than D, and 0 otherwise.

To summarize, the ICE can be used to establish media flow between a callee endpoint and a caller endpoint. In typical deployments, a network address translation (NAT) device or firewall might exist between the two endpoints. NATs and firewalls are deployed to provide private address space and to secure the private networks to which the endpoints. If the endpoint advertises its local interface address, the remote endpoint might not be able to reach it. Moreover, NATs and firewalls exhibit differing behaviour in the way they create the NAT-mapped addresses. ICE provides a generic mechanism to assist media in traversing NATs and firewalls without requiring the endpoints to be aware of their network topologies. ICE assists media in traversing NATs and firewalls by gathering one or more transport addresses, which the two endpoints can potentially use to communicate, and then determining which transport address is best for both endpoints to use to establish a media session.

FIG. 1A shows a typical deployment scenario with two endpoints that establish a media session.

Figure 6A:
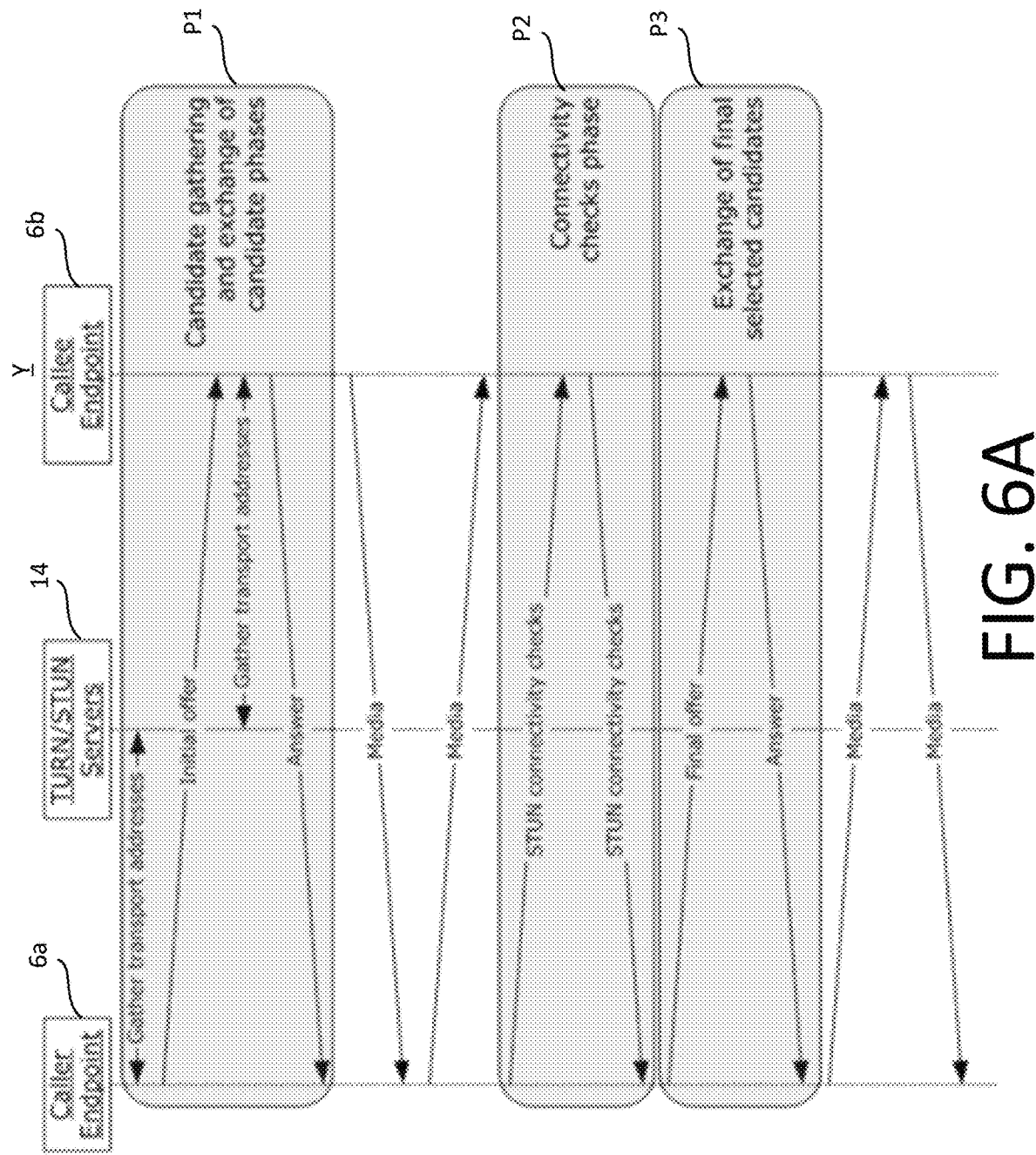
FIG. 6A shows a signalling diagram for a conventional Interactive Connectivity Establishment procedure.

FIG. 6 shows a sequence diagram that outlines the various phases involved in establishing a session between two endpoints, a caller 6a and callee 6b, using ICE. These phases are:

1. Candidates gathering and the exchange of gathered transport addresses between the caller and callee endpoints (P1);

2. Connectivity checks (P2);
3. The exchange of final candidates selected by the connectivity checks (P3).

During the candidate gathering phase P1, endpoints gather potential candidates for connectivity. This includes host candidates (bound to local interface), Server Reflexive Candidates (NAT mapping discovered using a TURN server), and Relay Candidates (forwarding port allocated on the TURN aka media relay server). The candidates gathered by the callee 6a are sent to the caller 6b in an offer message via the network 2. The offer can be encoded into an SDP offer and exchanged over a signalling protocol such as SIP. The caller endpoint 6a serves as a controlling agent and is responsible for selecting the final candidates for media flow. The callee 6b, after receiving the offer, follows the same procedure to gather its candidates. The candidates it gathers are encoded and sent to the caller in an answer message via the network 2. With the exchange of candidates complete, each endpoints 6a, 6b is now aware of its peer's (i.e. the other endpoint's) candidates.

During the connectivity checks phase P2, both endpoints pair up the local candidates and remote candidates to form a Check List of candidate pairs that are ordered based on the priorities of the candidate pairs and systematically perform connectivity checks using STUN binding request response exchange. This ordering ensures that TURN relaying is only used as a last resort, should all other types of path fail. At the end of the connectivity checks the caller 6a nominates (P3) the best candidate pair to be used for media flow and all other candidates are discarded.

The Traversal Using Relay NAT (TURN) protocol used by ICE enables a TURN client located on a private network behind one or more network address translation (NAT) to allocate a transport address from a TURN server that is sitting on the Internet. This allocated transport address can be used for receiving data from a peer. The TURN protocol also enables the client to discover its external NAT mapping.

Figure 6B:
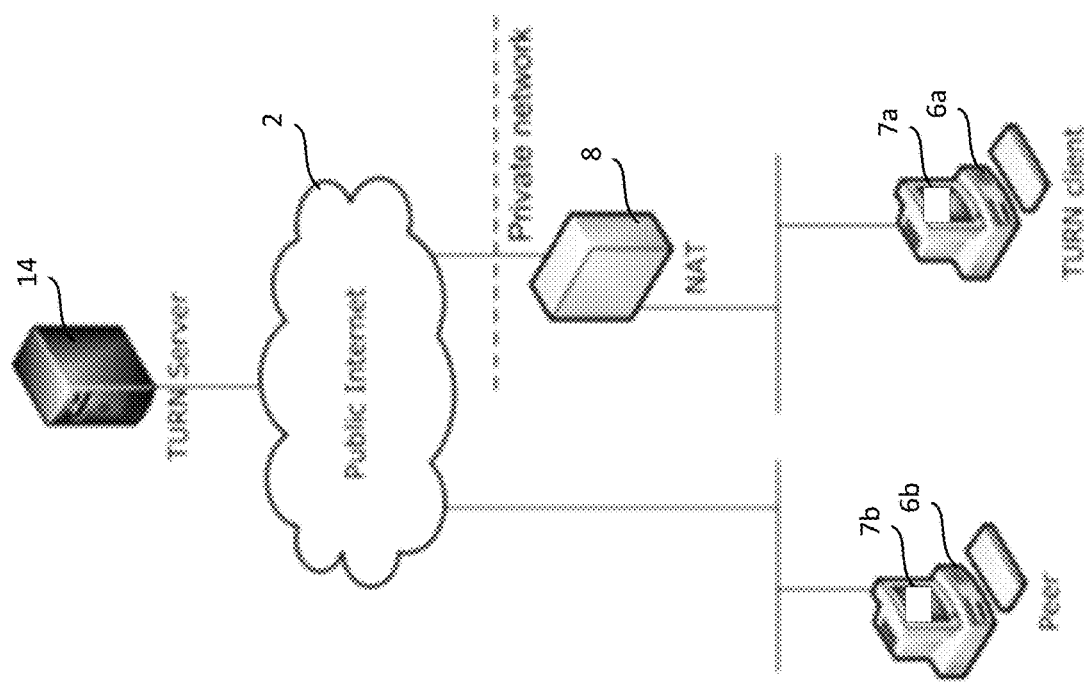
FIG. 6B shows a typical TURN deployment scenario.

A typical deployment, supported by the TURN protocol, where a protocol client is behind a NAT and is communicating with a peer on the Internet, is shown in FIG. 6B.

Figure 6C:
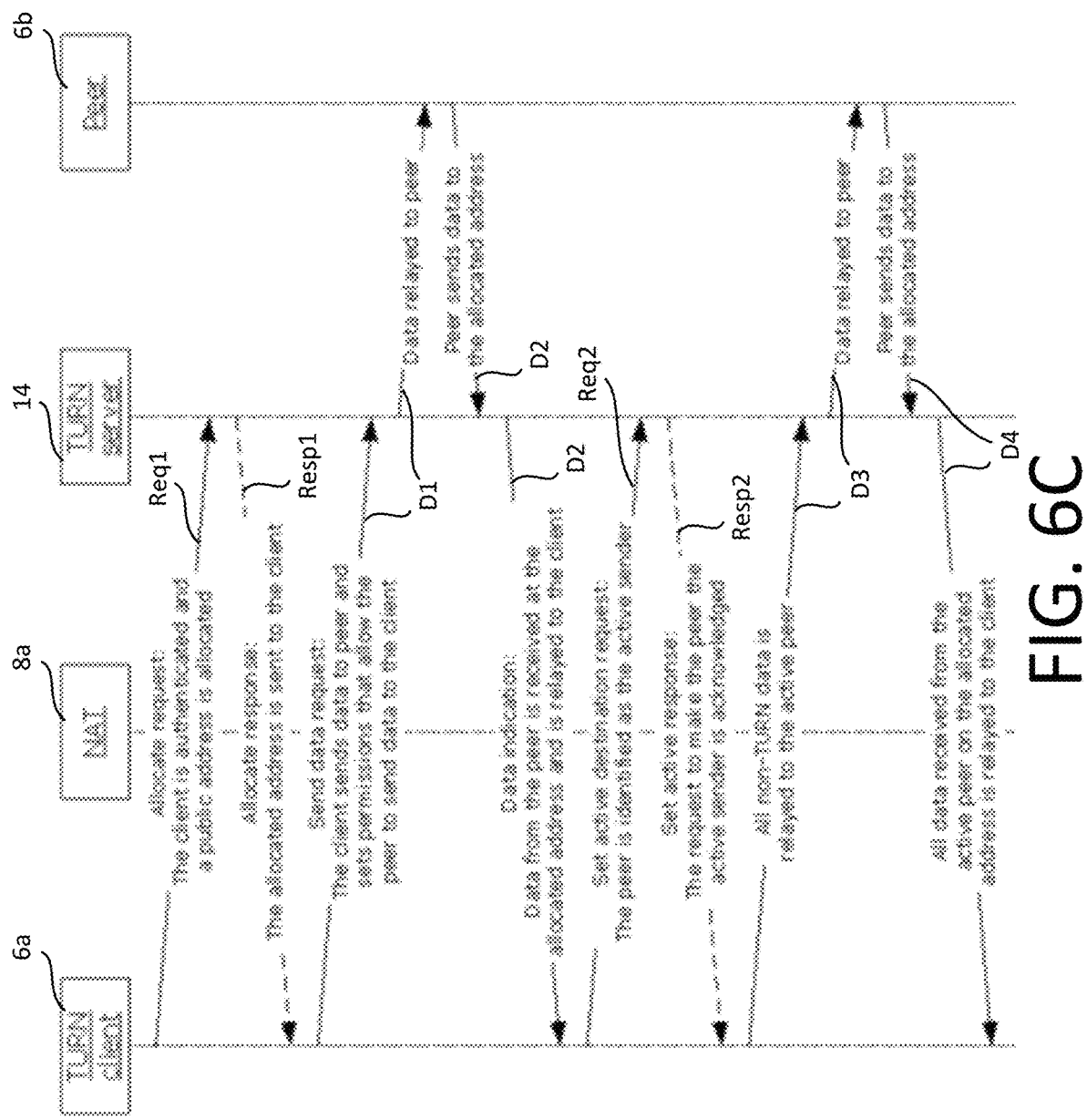
FIG. 6C shows a signalling diagram for a process of creating a conventional TURN session.

A typical, basic flow of TURN messages, in accordance with existing protocols, between a protocol client and a TURN server is shown in FIG. 6C.

When a protocol client 7a needs a public address to send data to or receive data from a peer, it sends an Allocate request message Req1 to the TURN server 14. This request is authenticated by the TURN server through a digest challenge mechanism. Once the TURN server has authenticated the Allocate request, it returns an allocated address to the protocol client in an Allocate response message Resp1.

At this point the allocated address has been reserved by the protocol client. It cannot be used to receive data from a peer until the protocol client 7a attempts to send data 7b to the peer by encapsulating the data in a Send request message. That is, at this stage the only way the client 7a can send data to the peer 6b via the relay 14 is in a Send request message. The Send request message serves two functions:

The TURN server relays data D1 contained in the Send request message to a peer 6b identified by a Destination attribute of the Send request message;
Permissions are set on the allocated address in a way that data D2 arriving on the allocated address from the peer 6b is relayed to the protocol client 7a in a Data Indication message.

If the protocol client 7a needs to communicate with more than one peer, it can send a Send request message to each peer. Once the permissions have been set for a peer, any data received on the allocated address from that peer is relayed back to the protocol client encapsulated in a Data Indication message. This message includes a Remote Address attribute that identifies the peer that originated the data. A Data Indication message is the only way the peer 6b can data to the client 7a at this stage.

If the protocol client 7a decides to communicate with a preferred peer, it can send a Set Active Destination request message Req2 to the TURN server 14. The TURN server 14 acknowledges the protocol client's request by responding with a Set Active Destination response message Resp2. This allows the protocol client 7a and TURN server 14 to stop using Send request and Data Indication messages to encapsulate data flowing end-to-end for this peer 6b, thus making the data communication channel more efficient. D3 and D4 in FIG. 6C represent relayed via the relay server 14 free from such encapsulation.

The existing TURN mechanism has several short comings. For example:

1) The process of gathering relay candidates involves several round trips of message (i.e. request-response) exchanges before a port can be allocated. This impacts call setup time.
2) TURN requires an individual physical port on the server to be allocated to each requesting client. This restricts the number of media sessions that a server can support limiting scalability.
3) TURN requires explicit messages to open up permission for a peer IP address before packets from the peer IP address can be received.
4) Ownership of an allocated TURN session cannot be transferred to an existing session i.e. the owner cannot be changed mid-session; also packets from a new peer IP address cannot be received. This prevents switching media flow across local interfaces or new peer addresses required for mobility (Wi-Fi to 3 g handover) or high availability and disaster recover scenarios.
5) Establishing a media session using ICE/TURN/STUN can be "chatty" and might not be feasible for areas with extremely poor network conditions. For such cases, MTURN provides a path for media flow without requiring several rounds of connectivity check exchanges.

The present disclosure defines mechanism and protocol exchanges which, among other things, address these shortcomings and which can serve as a building block for enabling mobility, call setup under limited bandwidth, HA/DR scenarios.

Figure 7:
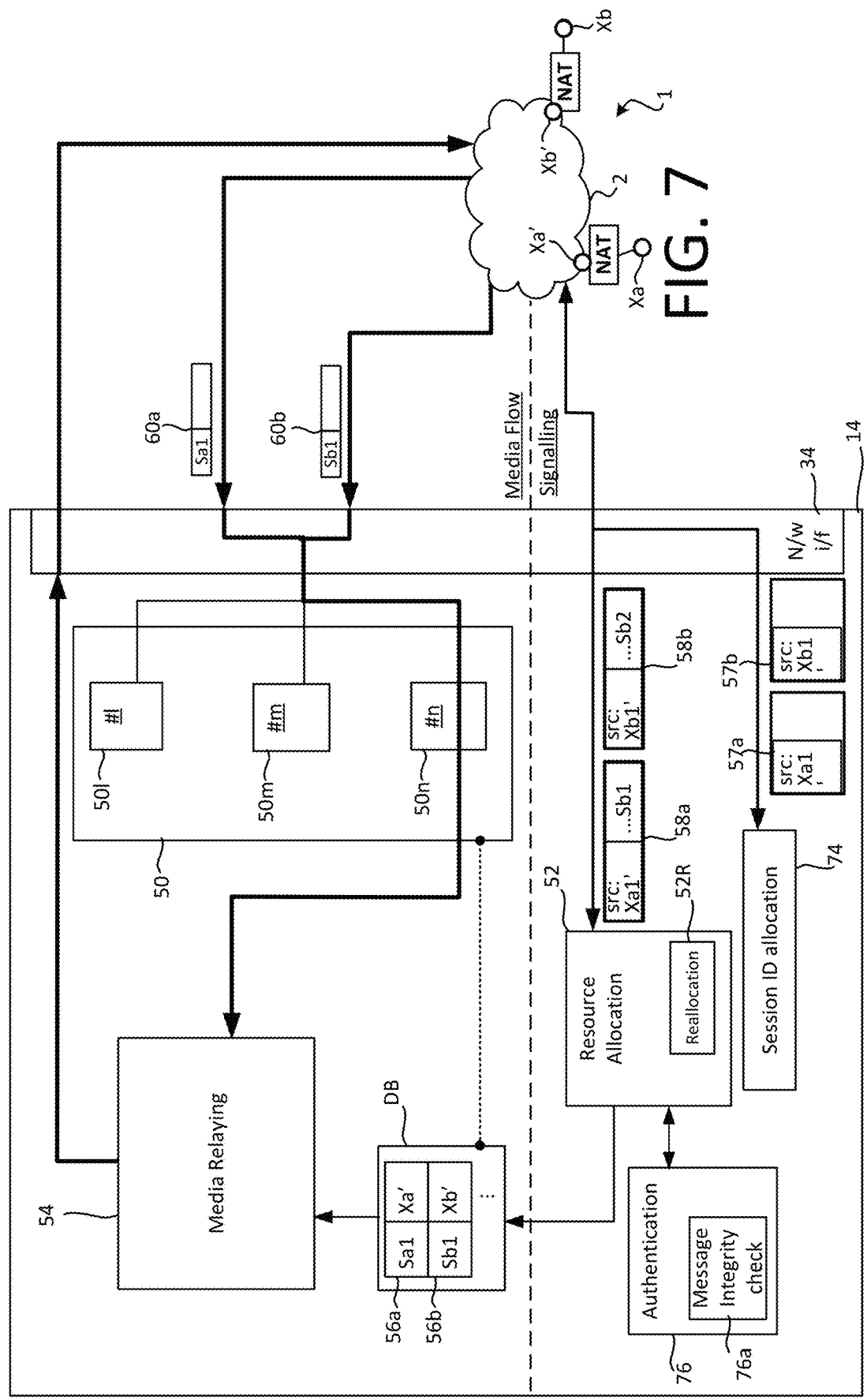
FIG. 7 shows functional modules of a media relay server.

FIG. 7 shows a block diagram of the server 14. The media relay server 14 comprises the network interface 14. The network interface has an assigned server network address, which is an IP address of the serve 14, and one or more physical ports 50 associated with the sever network address. The physical port(s) 50 are software entities of the kind discussed above that are executed on the processor 32 of the media relay server 14. Three separate physical ports 50m, 50n and 50l are shown by way of example, though there may be fewer or more ports than this in active use at the server, up to the 64 k limit. Each port is identified by a respective port identifier in the form of a 16-bit port number # 1, # m, # n of the kind discussed above.

The server 14 comprises the following functional modules, each of which represents respective functionality implemented by executing a respective part of the control code 13 on the processor 32: a resource allocator 52 which includes a reallocation module 52R; a media relaying module 54; and a session identifier allocator 74; and an authentication module 76, which is shown to comprise a message integrity verification module 76*a*. The memory 30 of the server 14 is configured to implement a port multiplexing database DB, accessible to the resource allocator 52 and to the media relaying module 54.

The resource allocation module 52 can access the database DB to update it, and the media relaying module 54 can access the database DB to at least read data stored therein. The database DB holds a plurality of session data blocks (sessions) 56*a*, 56*b*, . . . that are created and maintained by the resource allocation module. The media relay module relays media streams between network endpoints of the network 1. The database DB is associated with the port(s) 50, in the sense that the sessions 56*a*, 56*b* held the database DB dictate how the media relay module should relay media streams that are received via any one of the port(s) 50, and in particular where they should be relayed to.

The resource allocator 52 is communicatively coupled to the authenticator 76 and integrity verifier 78. The resource allocator 52 and session ID generator 74 can send and receive data to and from the network 2 via the network interface 34, for example via one of the ports 50*l*, 50*m*, 50*n* or via a different port of the network interface 34. The creation and, in some cases, subsequent handling of the sessions 56*a*, 56*b* is at least to some extent conditional on the operations of the authenticator 76, and in particular those of the integrity verifier 76*a*.

Existing Implementations.

ICE:

Delay in Gathering Relay Candidates:

During the candidate gathering phase ICE attempts to gather every possible candidate.

This includes TURN TCP, TURN UDP, server reflexive candidates and host candidates. The host candidates can be gathered almost instantaneously however gathering relay candidates can take time especially in poor networking conditions. Gathering of relay candidate runs in two phases:
1. Contact Phase—multiple servers if configured are probed to find a server that is reachable.
2. Allocation Phase—relay candidates are gathered from the first server that was reached in the previous phase.

In some existing implementations, the contact phase may have a worst case timeout (t1 seconds) i.e. If none of the servers are reachable the offer will be ready in t1 seconds with no relay candidates. The allocation phase then proceeds only if a relay server is successfully reached in the contact phase. Allocation phase may also have a worst case timeout (t2 seconds). Including both phases the absolute worst case is t1+t2 seconds for the offer to be ready.

Static Connectivity Scheme:

At the end of the connectivity checks all candidates other than the final candidates are discarded. Existing implementations do not maintain a backup path to fall back on in case of failure with the primary path. Existing implementations also do not dynamically discover new candidates and add them to the connectivity matrix. This is primarily due to requiring signalling support to exchange the new candidate to the peer since a TURN server will not forward packets from an unknown destination. Failure in the primary path during the media sessions results in the call getting dropped with no recovery mechanism built in directly onto the transport layer.

Inconsistent NAT Mapping:

The ICE state machine is inherently complex since its trying to evaluate multiple paths and discovering new mappings on the fly. NATs and software load balancers can behave erratically throwing the ICE state machine into an inconsistent state resulting in both endpoints not being able to converge on the right media path. This problem has been largely mitigated by implementing multiplexing of RTP/RTCP on the same port.

Signalling Dependency:

Current ICE implementation relies on signalling for not only initial candidate exchange but also for confirming the final candidates. This builds brittleness into the system by adding dependencies spanning across team boundaries. The transport layer should be able to independently make changes to media paths on the fly without requiring signalling support as much as possible.

TURN:

Physical Port Limitation:

A TURN server currently requires a physical port to be allocated for every TURN allocation. This limits the number of TURN sessions that can be supported by a TURN server. This makes it prohibitively expensive for clients to pre allocate or maintain long standing TURN allocations as a backup path. Also allocating physical ports on the media relay creates a configuration burden to maintain and ensure ACLs (Access Control Lists) and firewall policies are setup to allow traffic on a wide port range in/out of the data centres.

Permission Establishment:

The TURN server will forward packets from the allocated port only from addresses for which permissions have been explicitly setup using a Send Request. This requires taking a dependency on an independent channel to signal remote IP address to the peer to setup permissions before the relayed candidate can be used.

Protocol Specific Allocation:

The clients have to reach the relay over UDP to allocate a UDP candidate and similarly TCP to allocate TCP relay candidates respectively. This increases time to gather relay candidates especially under poor network conditions. E.g. On windows platform for example if the TCP SYN packet is lost the TCP SYN will be retried only after three seconds.

Ownership of TURN Session:

Ownership of an allocated TURN session is bound to the transport address from which the TURN session was allocated. There is currently no mechanism to transfer ownership of an existing TURN session to a different transport address. This limits the extent to which TURN can provide seamless roaming and interface switching scenarios.

New MTURN Implementations:

In contrast to conventional TURN, in MTURN, All TURN sessions are multiplexed on a small set of MTURN allocated ports.

MTURN addresses the limitations with existing TURN implementation outlined above and provides additional functionality to support emerging requirements around call setup time, reliability and mobility.

MTURN also adds support for Anycast deployment of relay servers. The same authentication scheme used for TURN can be used for MTURN and to a large extent procedure to allocate a MTURN candidate on the relay will be similar to allocating a TURN candidate. The security ramifications and mitigations for MTURN will also be covered. Anycast is a one-to-nearest routing methodology, whereby packets are routed from a routing node to a single member of a group of potential receivers that are all identified by the same destination address. The single member is the topologically nearest node to the routing node.

For a media relay server 14 configured to implement MTURN, an allocation proceeds as follows:
1. When a client requests an MTURN allocation the client is not allocated a unique physical port but instead is allocated a unique MTURN session identifier and an allocated port that will shared between TURN sessions of the same modality type. The MTURN session identifier will serve as the reservation token. For example, the following port allocations may be used:

a. audio port number 3479 (M-TURN-AUDIO-PORT), via which an audio stream can be relayed to the requesting client by its peer(s) 6b;

b. video port number 3480 (M-TURN-VIDEO-PORT), via which a video stream can be relayed to the requesting client by its peer(s) 6b;

c. application port M-TURN-APP-PORT (3481), via which any other type of data can be relayed to the requesting client by its peer(s) 6b. For example, one port may be provided for any and all other modalities (e.g. shared by, say, screen sharing, file sharing, whiteboard session, instant messaging etc.), or an individual port may be provided for each modality. More generally, one or more additional ports can be shared between one or more other media modalities in any combination.

2. Any peer endpoint that has access to this session identifier can send packets to the owner of the MTURN session without requiring the owner of the TURN session to explicitly open up any permissions.

3. The MTURN session ownership is at least initially associated with an IP address and port that allocated the TURN session i.e. of the requesting client. This disclosure provides a way to hand over ownership of the allocated session to a different local IP address and/or port on the client.

The port allocation scheme makes applying modality specific Quality of Service (QoS) markings simple.

Moreover the allocated ports (e.g. 3478, 3480, 3481) are separated from a control port (e.g. 3478) i.e. a separate, dedicated control port is provided on the TURN server to which control signals for controlling a media session can be directed. Separating the control port 3478 and allocated ports reduces header overhead on the clients.

Figure 8:
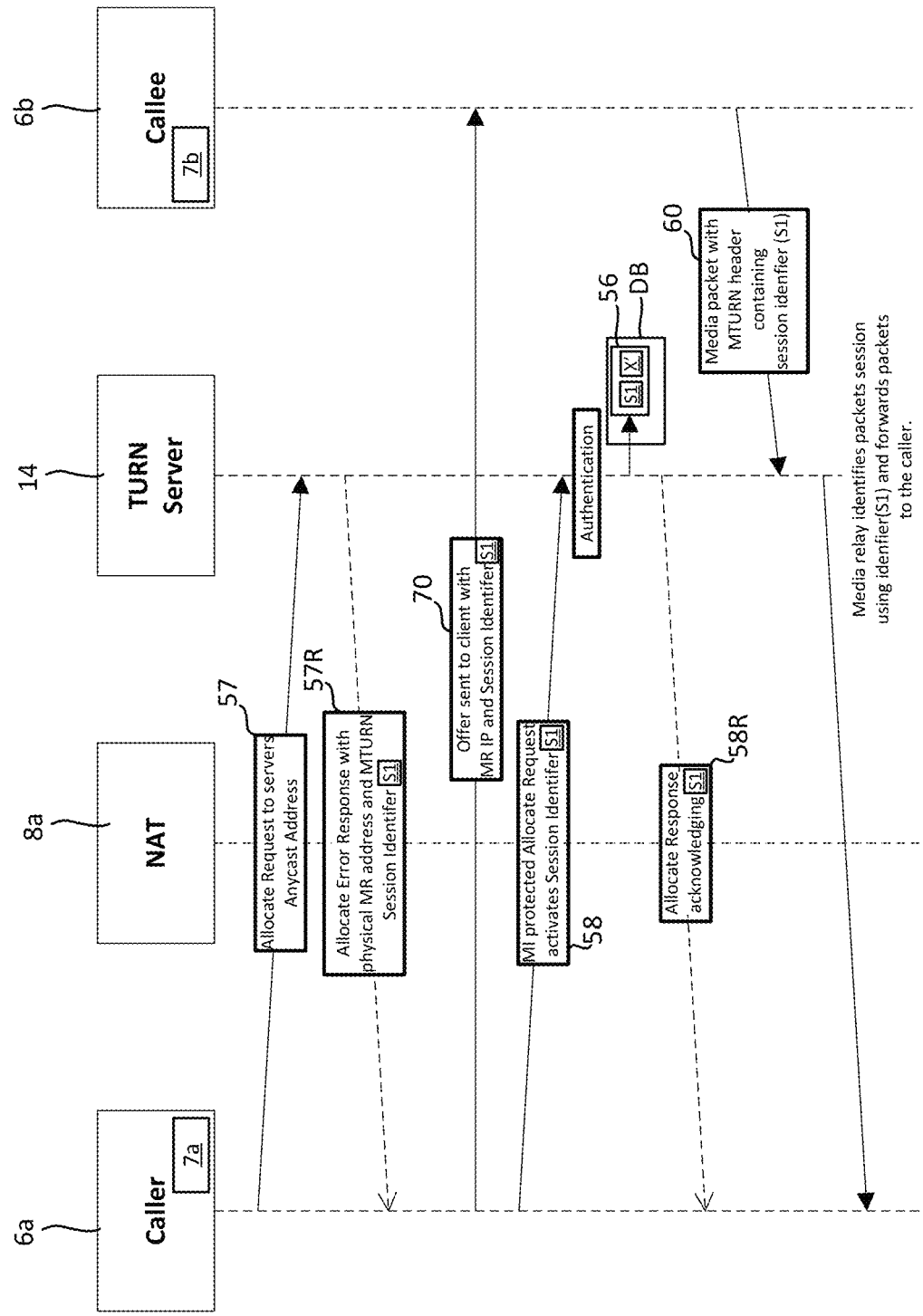
FIG. 8 is a signalling diagram showing signalling for a process of creating an active media session.

Allocating and Using an MTURN Candidate:

With reference to FIG. 8, exemplary steps involved in allocating and using a MTURN candidate when the client is configured with an anycast IP address of the media relay server 14 for audio modality will now be described. FIG. 8 is a signalling diagram for an MTURN candidate allocation procedure.

The steps are as follows.

Step 1: A caller 6a sends an Allocate Request (first/provisional allocation request) 57 for an MTURN candidate to the media relay server's anycast address. A service quality attribute present in the allocate request 57 is used by the relay server 14 to identify a modality type. For example, the seqvice quality attribute may indicate that the caller 6a is only permitted to the media relay 14 server for audio (not video).

Step 2: In response, the media relay server 14 sends an Allocate Error Response (401) 57R (first response) that provides a direct IP address of the media relay server, the port number of the M-TURN-AUDIO-PORT (in this example) and also a reservation token, which is a unique MTURN session identifier S1, generated in this example by the session ID allocator 54. Alternatively, the port number may be omitted from the Allocate Error Response response 57R and the caller 6b may be configured to use a default audio port number. A reflexive transport address of the caller 6a may also be determined by the client in the manner described and returned in the response 57R.

Step 3a: At this point the server 14 has not created a TURN session but the client has enough information to send an ICE offer 70 (i.e. "Initial Offer" in FIG. 6A), comprising an MTURN candidate, to the peer endpoint. The MTURN candidate comprises the direct media relay IP address, M-TURN-AUDIO-PORT and the session identifier S1.

Step 3b: In parallel with sending the offer 70 at step 3b, the caller client 7a activates an MTURN session associated with session identifier S1 provided in step 2 by sending a allocate request 58 (second/non-provisional allocation request) comprising the session identifier to the server 14. The allocate request 58 of step 3b is message integrity protected. Validation of the message 58 is performed by the integrity verifier 76a of the server 14 based on this integrity protection. Provided the message 58 is found to be valid, i.e. providing the integrity of the message 58 is uncompromised i.e. providing the message 58 is determined not to have been altered since it was sent, the resource allocator 52 of the server 14 creates an active session 56, comprising the session identifier S1 in association with a transport address X' of the caller (see below), in the port multiplexing database DB in response, and a response 58R to the second request 58 (second response) is returned to the caller 6a indicating that the session is now active. If the integety of the message cannot be verified, the request 58 is refused.

Figure 10:
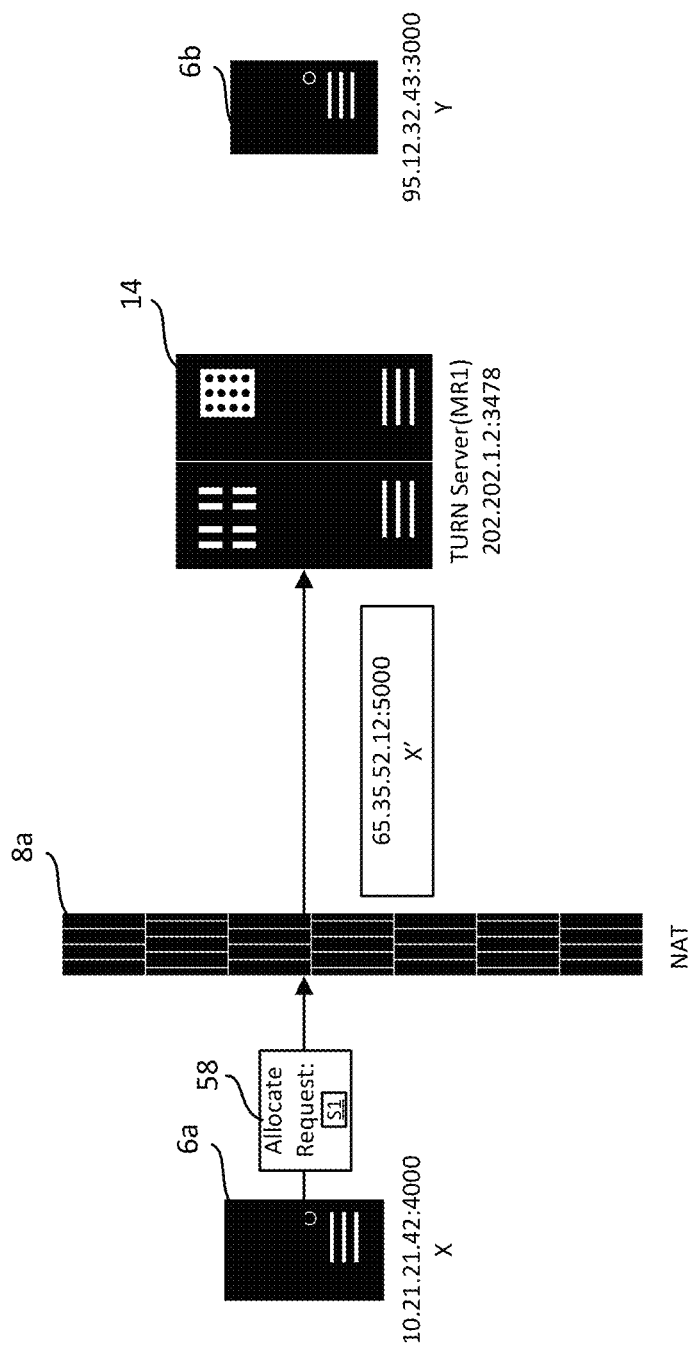
FIG. 10 illustrates an interaction between an endpoint and a media relay server via a NAT.

As illustrated in FIG. 10, the transport address X' is a transport address on the public side of the NAT 8a in front of the caller 6a, mapped thereat to a local transport address X of the caller 6a in the private network 5a. It can be obtained by the server 14 in the manner discussed.

Once the active session 56 has been created, the callee 6b can start sending media packets 60 to the caller endpoint to the IP address of the media relay 14 in the offer 70 by encapsulating the packets with a thin MTURN header that includes the session identifier S1 that was provided in the offer. The relay module 54 of the media relay server 14 reads the session identifier S1 in the thin header, and forwards the packet 60 to the transport address X' associated with that session identifier S1 in the database DB.

Returning to FIG. 7, multiple, different caller endpoiunts having private transport addresses Xa, Xb are shown, which are mapped to public addressed Xa', Xb' by NATs. The session ID allocator 74 is configured to receive multiple provisional requests 57a, 57b for the different caller endpoints and to allocate a unique session ID Sal, Sb1 in response to each. Each time a subsequent, non-provisional request 58a, 58b containing the relevant session identfier Sal, Sb1 is received, the resource allocation module creates a respective session 56a, 56b in the database DB associating that session identifier with the public transport address Xa', Xb' of the relevant caller endpoint. Thereafter packets 60a, 60b destined for the different caller endpoints can be directed to the same port (e.g. # n) of the server 14. The media relay module 54 looks up the transport address Xa', Xb' associated in the database DB with the session identifier Sal, Sb1 in the thin MTURN header of that packet 60a, 60b, and relayes it to that tranport address Xa', Xb'. Upon arrival at the relevant NAT, the packet it routed from there to the correct caller endpoint.

Where an endpoint is not behind a NAT, but relaying via the server 14 is nevertheless desired for whatever reason, the association in the database DB will be between the session identifier and a local transport address of the caller (which will be a public address in this case).

With the above, the time needed to generate the offer 60 is just one RTT (Rount Trip Time) from the caller 6a to the media relay server 14 over UDP, i.e. only one request-response exhange between the caller 6a and relay 14. Once the offer 60 is received the peer endpoint 6b can start sending media 60 to the caller 6a using the MTURN session identifier and the packets will be delivered to the client 7a on the caller endpoint 6a. There is no requirement for the caller 6a to open up permission for the callee 6b.

Separating the request (step 1) from the activation (step 3) is not essential, but this separation is followed in certain embodiments for the following reasons.

Firstly, the first allocate request 57 from the client 7a is not message integrity protected; for security reasons, the media relay 14 may be configured so as not to create any state or spools up resources on behalf of the client 7a until it has received an integrity protected message (which the second request 58 is).

This enables operation within the framework of the STUN short term short-term credential mechanism (see RFC5389 "Session Traversal Utilities for NAT (STUN)"; 10. Authentication and Message-Integrity Mechanisms; http://tools.ietf.org/html/rfc5389# section-10).

The short term credential mechanism assumes that, prior to a STUN transaction, the client 6a and server 8a have used some other protocol to exchange a time-limited credential in the form of a username and password. This credential is used to form the message-integrity check for subsequent messages. Within this framework, the session identifier can be safely issued before the credential exchange has taken place and thus before the device 6a has been authenticated, without integrity protecting the first allocate request 57 which reduces call setup time. However, the session identifier cannot be used until the credential exchange has taken place, as the credential is needed to protect the second request 58, which ensures that security is not compromised.

This is also the reason for the response 57R being an Error Response (401)—in accordance with the short term credential mechanisms, an Error response is returned to any request that is not integrity protected with the credential.

Note: the possibility of integrity protecting the first request 57 e.g. by some other integrity portection mechanims in alternative implementations is not excluded. Further, the short-term credential mechanism is just one option within the scope of this disclose; for example the long-term credential mechanism (http://tools.ietf.org/html/rfc5389# section-10.2) could be used instead, which is based on what is essentially a traditional log-in based on a persistent, rather than time-limited, username and password.

Secondly, step 3 provides an additional layer of security. Even if a peer gets hold of the session ID S1, it can only be used on the relay 14 for the window in which that session ID S1 has been activated.

Looking at this another way, the separation of steps 1 and 3 means that session identifiers can be safely handed out to any requesting client without needing to authenticate that client first. Coupled with the fact that the session identifiers are a significantly less valuable resource (compared with ports in the context of conventional TURN) due to their greater bitlength, this leaves the media relay server free to hand out session identifiers as soon as they are requested i.e. in direct response to a request, which in turn reduces call set up time as the requesting client 7a can send the offer 70 straight away. In other words, it is the combination of i) port multiplexing using session identifiers and ii) the separating of authentication from the issuance of session identifers that makes viable the direct provision of a session identifier in a single request-response exchange i.e. in direct response to a provisional allocation request 57, thereby reducing call set-up time particularly where an ICE call set up procedure is followed by the clients 7a, 7b as an MTURN candidate becomes available more quickly (than a conventional TURN candidate can be safely made availablle).

The flow above shows the relay server 14 allocating the MTURN session identifier S1. However, functionally the session identifier S1 can be generated by either the client 7a or the server 14.

On the one hand, server-side generation enables the size (i.e. bit length) of the identifier to be reduced, as the server 14 can coordinate to avoid collisions that might otherwise occur if client were to generate shorter identifier.

On the other hand, client-side generation enables call setup times to be reduced even further because the client can send the offer 60 containing a self-generated session identifier immediately i.e. without having to first request a session identifier form the server 14.

With this approach, a longer session identifier, e.g. a GUID, is more appropriate to reduce (in the case of a GUID, effectively eliminate) the possibility of collisions. For a GUID, this increases the size of the MTURN identifier to 16 bytes.

Which approach is most appropriate is context dependent.

Note that the above considers by way of example a scenario in which MTURN resources are allocated to a caller endpoint. However, this is just an example—alternatively or in addition MTURN resources can be allocated to a callee endpoint in the same way. In the context of ICE, a callee endpoint can include an MTURN candidate in its "Answer" at the end of phase P1 (see FIG. 6A).

For ICE-based implementations, an MTURN candidate can be treated as if it were a regular TURN relay candidate, subject to the addition of the session identifier, with connectivity checks (phase P2) and final selection (phase P3) proceeding accordingly.

In this case, a candidate pair containing an MTURN candidate(s) (for the caller, callee or both) will generally only be used as a final candidate pair in phase P3 as a last resort, in the event that connectivity checks for all other candidate pairs in phase P2 fail. This can be effected by assigning the multiplexed relayed candidate a suitably low priority relative to other types of candidate.

Message Formats and Attributes:

MTURN Session Identifier Attribute:

FIG. 9A shows a possible format of the first response 57R returned by the server 14. For server-side session ID generation, a session identifier attribute in the first response 57R is populated by the media relay server 14 in response to an allocate request 56 from the client. The populated attribute is included in the first response 57R. An exemplary session identifier attribute 72 is shown in FIG. 9A.

In this example, the attribute is 8 bytes (64 bits) in length and the relay server 14 ensure that this identifier is randomly generated and is unique per active TURN session 56.

The value for an MTURN-IDENTIFIER attribute is picked from a user definable range, and distinguishes MTURN from other protocols. A Length field holds the length in bytes of the Session Identifier following the Attribute Length field itself.

MTURN Header:

FIG. 9B shows a possible format of a media data packet 60 to be relayed by the server 14, including the thin MTUN header 60h, which is 12 bytes in this example, followed by a payload 60p containing the actual media data to be relayed. This 12 byte overhead is small enough to not cause issues with increase in packet size with the header encapsulation.

An MTURN header format is adopted which enables the same port to receive either e.g. RTP, STUN or MTURN messages. The protocols are disambiguated by inspecting the first two bits of the first byte of the header 60h. For example: 00=>STUN, 10=>RTP, 11=>MTURN.

A channel ID field can for example be set to a predetermined value to for MTUN packets e.g. 0xFF10, where 0x denotes hexadecimal.

A destination field holds the 64 Bit MTURN Session Identifier S1 of the MTURN allocated port that is the destination. A length field holds the number of bytes of the frame following immediately after the Length field itself.

The packet 60 is an application layer packet i.e. both the header 60h and payload constitute application data, contained in the payload(s) of one or more lower-layer packets when transmitted. Thus the session identifier constitutes application data, in contrast to a port identifier which is a transport layer identifier. More specifically, the session identifier constitutes an application transport layer parameter, used by an application transport layer(s) protocol at the application layer (whereas TCP/UDP, which use the port number, are lower-layer transport protocols at the network transport layer, beneath the application transport layer).

MTURN Session:

When the client 7a sends the Allocate Request 58 protected by message integrity to activate a MTURN session identifier S1, an MTURN session 56 gets created on the media relay server 14. This section continues from the second message integrity protected allocate request 58 sent by the client to the media relay to activate the session identifier S1.

An exemplary MTURN session will now be described with reference to FIG. 10. The client 7a sends the allocate request 58 with MTURN session identifier S1 from 10.21.21.42:4000 (X) which the NAT 8a maps to 65.35.52.12:5000 (X'). This message 58 is message integrity protected and serves to activate the session identifier S1. The TURN server will eventually see the request originate from X'. For simplicity it is assumed that the peer 6b is directly reachable on the public internet 2 on 95.12.32.43:3000 (Y), though if the peer is also behind a NAT Y may instead be a transport address on the public side of a NAT or indeed a transport address of another TURN server which has allocated resources to the peer 6b (see below).

The TURN server 14 on receiving the request will create the TURN session 56. The TURN session is a data block in the database DB that contains all relevant information to maintain and serve a TURN session. An exemplary MTUN session is shown in FIG. 11A, and is shown to comprise an MTURN session identifier field 56(i) and an MTURN session owner field. Active destination address and active MTURN session identifier fields 56(iii), 56(iv) are also shown, the purpose of which will be described shortly.

MTURN Session Identifier: this field is populated with the session identifier S1.

MTURN Owner: this field is set to the transport address X' (IP address+port) that allocated and owns the MTURN port. This is the transport address to which packets 60 sent referencing identifier S1 will be delivered.

Active Destination Address: this field is populated if the owner of the allocated port sends a Set Active Destination ("SAD") Request to reduce Send Request and Data Indication overhead on the leg between MTURN owner and the TURN server. That is, to give permission for data to be sent from Y to the client 7a via the server 14 without using Data Indication Messages, and to enable the client 7a to send data to Y via the server 14 without using Send Request messages (see above). FIG. 11B shows the session 56 when the MTURN owner has set the Active Destination 56(iii) to Y.

Active MTURN Session Identifier: If the peer 6b is itself a MTURN candidate, then the SAD request in addition to the active destination address Y will also provide a second MTURN session identifier S2. This is done to reduce header overhead on the client so that the media relay server can add the MTURN header on the client's behalf once SAD is completed.

Consider an alternate topology where the media is flowing MTURN-MTURN between two media relay servers—having transport addresses MR1 and MR2 respectively—with MTURN identifiers S1 and S2 respectively for audio. That is, X↔MR1↔MR2↔Y. This is in contrast to a conventional TURN topology, in which media would usually only flow via at mort one server in each direction i.e. X→MR2→Y (MR2 being one of Y's candidates) and X←MR1←X (MR1 being one of X's candidates).

For this case after SAD the TURN session 56 on MR1 would be populated as shown in FIG. 11C. In particular, the active MTURN session identifier field is populated with the second session identifier S2 of a session on the other media relay server serving the peer 6b.

With the TURN session setup as above after SAD transaction, the relay servers 14 can take over adding MTURN headers so clients will no longer need to include MTURN headers and avoid the MTURN header overhead. That is, when the media relay 14 receives a stream from X (not Y), it modifies it to include the session identifier S2 (not S1) and directs the modified stream to MR2. Because S2 has been included in the stream, this allows the other media relay server 14' to multiplex over its own port (3479 in the example of FIG. 11C).

For traffic between two media relays, this also opens up possibilities to batch packets and potentially even jumbo packets if supported in the data centres. For example, if a media path is MTURN-MTURN, the media path includes a leg between two TURN servers. The TURN serves are typically deployed in large data centres with high bandwidth and throughput. This open up the possibility of batching traffic and jumbo sends/receives between the servers involved.

Sending Packets Using MTURN Port:

In addition to receiving relayed packets, the MTURN owner X (i.e. 6a) can send packets using the allocated port using the standard Send Request mechanism used by TURN to send packets to Y (i.e. 6b). The handling on the server and the client is the same as regular TURN packets.

Sending Packets Using MTURN Port after SAD:

If the peer Y is a non-MTURN candidate then packets can be sent without any MTURN encapsulation after Set Active Destination. This will continue to just work after removing the Send Request and Data Indication headers.

However if the peer is also a MTURN candidate then the SAD destination request should also include the MTURN identifier of the destination MTURN candidate so that the relay server can add the MTURN headers on the packets being sent to the remote relay server.

This determination will be made by the clients i.e. a client determined whether or not its peer is an MTURN candidate. With the offer answer exchange of candidates both endpoints will know the paths being used for media flow.

Receiving Packets on MTURN Allocated Port:

When a packet is received on the MTURN allocated port from the peer 6b, the relay server 14 can identify the correct MTURN session 56 using the MTURN session identifier S1 that is part of the MTURN header 60h. If a valid MTURN session 56 is found then the payload 60p is forwarded to the MTURN owner address field X' of the MTURN session 56. If no valid TURN session is present then the packet is discarded.

The processing of packets 60 is the same before and after Set Active Destination. The session is always identified using the session identifier S1 present in the MTURN header 60*h*.

For the example above if the peer Y wants to send a packet X using the MTURN allocated port, Y will send its packets as:

| | |
|---|---|
| 0xFF10 | Length = len (s1 + payload) |
| | MTURN Session Identifier S1 |
| | Payload |

Encoding MTURN Candidates in SDP:

A new candidate type mrelay will be introduced to support MTURN candidates without breaking backward compatibility:

Format: a=candidate:1 UDP MRIP Address MTURN Port typ mrelay ID MTURNSessionIdentifier Eg: a=candidate:1 UDP 202.202.1.2 3479 typ mrelay 302452389 raddr 10.21.21.42 rport 4000

MTURN and ICE:

MTURN can be either be used standalone path independent of ICE) or to provide an additional type of ICE candidate (similar to demoted scenarios).

ICE provides a framework for validate media paths and MTURN is another potential path for the ICE state machine. For an ICE implementation, a multiplexed relayed candidate ("MTURN candidate") could be one of the candidates that is gathered and exchanged as part of ICE connectivity establishment. An MTURN candidate is a formed of a transport address (IP address+port number) on a TURN server and a separate unique session identifier in addition to the port number. The MTURN candidate forms part of an ICE candidate pair eligible for connectivity checks and which will be selected for the media session assuming i) no higher priority candidate pair is determined to be valid in the connectivity checks, and ii) the MTURN candidate pair is itself determined to be valid in the connectivity checks. The other candidate in the MTURN candidate pair could be a host candidate, reflexive candidate, a conventional relayed candidate (i.e. a transport address on the TURN server with no session identifier) or another MTURN candidate (with its own session identifier) for an MTURN↔MTURN path. The MTURN candidate may be included in multiple candidate pairs, each eligible for connectivity checks. Note that an optimization can be implemented, whereby connectivity checks are not actually performed for a candidate that is used for the media session: for example, where a candidate pair comprises a relayed (e.g. multiplexed relayed) candidate, it may be determined to be valid by the endpoint(s) by assumption (as it is highly likely to be valid), without checking that candidate. Where both candidates in a candidate pair are relayed, it may be assumed that the pair is valid and connectivity checks not performed for the pair at all. In that case, the dual-relayed candidate pair may be used for the media session if no higher-priority pair is found to be valid during the connectivity checks, without performing connectivity checks for the dual-relayed candidate pair.

Security Considerations:

MTURN allows packets to be relayed through the relay server 14 as long as the peer 6*b* knows the MTURN session identifier S1. Any potential risk is mitigated by the session identifier S1 being randomly generated across a≤64 bit space and the session identifiers being valid only for the duration of the media session i.e. for which the media session 56 is active.

In embodiments, consent freshness checks that are message integrity protected can be used to provide another layer of protection. A media session that fails a consent freshness check will be torn down.

Call Setup Reliability and Setup Time:

Optimizing Call Setup Time:

For mobile devices and also for emerging markets where the networking quality is poor, MTURN can be leveraged to significantly cut down on call setup time and improve reliability. This will be close to near instant connectivity establishment. Based on ECS configuration, endpoints can be configured to gather and use only MTURN candidates as an extreme solution. Even if the MTURN candidate is only allocated as part of call setup, the time to gather MTURN candidates and get the offer ready is only one UDP RTT.

No further connectivity checks validation or probing is required to setup the media path. Media can start flowing immediately after the initial offer/answer exchange on the MTURN candidates. With an Anycast deployment of relay servers and MDN (Message Disposition Notification), a reliable media relay deployment can be safely assumed.

The call setup time can be further reduced if the MTURN candidate can be pre-allocated, and/or generated by the client. This enables near instant connectivity that will be very useful, for example, for call upgrade scenarios from cellular to VOIP.

Note: If the client is behind a UDP blocking, the MTURN candidate can still be allocated over TCP. This will take longer than one RTT for UDP. The delay can be reduced by attempting UDP and TCP in parallel and discarding TCP if the client can successfully reach the relay over UDP, so that no unnecessary delay is incurred either way.

In this respect, the server 8*a* can be configured to provide a TCP-UDP bridge. claims. The client 7*a* could reach the MTURN server over TCP but still a get a allocated port that is UDP e.g.: the leg between the client 7*a* and MTURN server 8*a* could be TCP, but the flow between the MTURN allocated port and the peer endpoint 6*b*/MTURN server 6*b* could be UDP.

Improved Reliability:

Both the caller and callee endpoints 6*a*, 6*b* may be able to allocate MTURN candidates on the relay servers geographically closest to them. With existing TURN implementation even if one of the endpoints run into a relay allocation failure for any reason it will result in a connectivity failure if the endpoints involved are behind a NAT.

With MTURN the call can survive and be established even if only one of the endpoints was able to gather MTURN candidates. This works even if the both the endpoints are behind NATs. Using the session identifier S1, the NAT mapped address no longer needs to be discovered to open up permissions explicitly for IP addresses.

Ownership Handover:

Seamless Local Interface Switching:

Ownership of an active MTURN session can be transferred mid-session by the reallocation module 52R from a current transport address X' to a new transport address Z'. This can be whilst an existing media stream is being relayed to X', and in response to the reallocation the media relay module 54 redirects the existing media stream to the new address Z'.

This will now be described with reference to FIGS. 12A and 12B

As an example, consider the case where a machine has both a wired interface (having a local transport address X) and a wireless interface (having a local transport address Z), and the MTURN candidate was allocated using wired interface (X) in response to allocation request 58. The underlying TURN session would in this case be populated as shown on the left-hand side of FIG. 12B.

If the wired interface gets disconnected, the ownership of the MTURN session can be seamlessly handed over to the wireless interface as follows.

A new allocate request 58' is sent from the wireless interface 192.1.1.12:5000 containing the same MTURN session identifier S1. This allocate request 58' is also protected by message integrity so there are no security issues with this. The reallocation module 52R updates the session 56 having that session identifier to replace X' with Z' as obtained from the new request 58'.

Figures 12A, 12B:
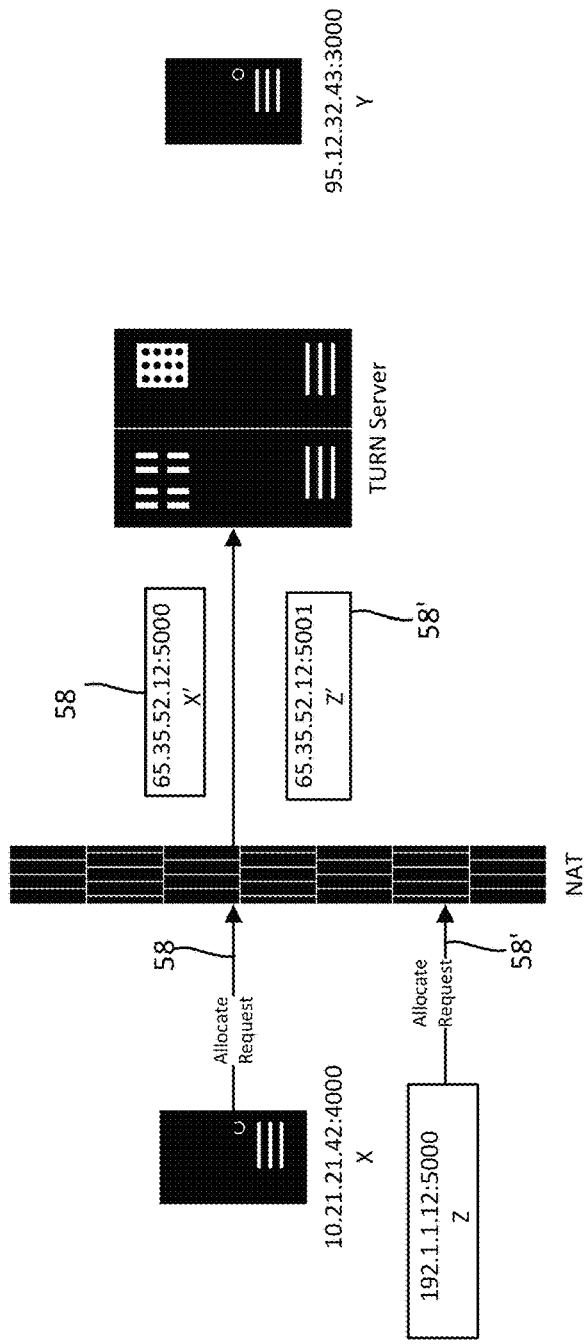
FIGS. 12A and 12B illustrate a mechanism by which ownership of an existing media session can be changed.

The MTURN session state after the relay server has processed the allocate request is illustrated on the right hand side of FIG. 12B.

This switch is achieved seamlessly with just one allocate request 58' to the relay server 14. This switch does not involve any signalling support or any additional Set Active Destination transaction. Thereafter, the MTURN candidate can be used by the wireless interface and any packets sent by the peer to the MTURN port will be relayed to the wireless interface (Z) rather than the wired interface (X).

High Availability and Call Resiliency:

With current implementation at the end of connectivity checks both endpoints converge on a media path. If this media path fails for any reason this will translate to a mid-call failure. This section goes over a few potential failure scenarios and how the call can continue to survive for these failures.

Relay Upgrades/Outage:

With relay servers deployed on edge machines, the relay servers can be potentially be taken down mid-call. The clients should have ability to detect the calls to a different relay server as seamlessly as possible.

There are two possible cases:
1. The relay notifies the client that it will be brought down using an Allocate Error Response with an alternate server that the clients can try in response to a client's attempt to use the allocated port for sending packets. This needs new functionality on both media relay server and clients to handle this for a TURN session that is part of an established media session.
2. Clients implement dead relay detection by periodically refreshing allocate requests. The detection scheme can be finalized as part of detailed design.

For both cases the client will need to allocate a new MTURN candidate from the relay and switch the media flow to the new MTURN candidate without significant impacting on the call. There are several potential variations for media flow. Call could be flowing direct-direct, MTURN-direct, MTURN-MTURN but underlying recovery mechanism the same.

Call Recovery:

A call could be flowing direct-direct, MTURN-direct, MTURN-MTURN; the underlying recovery mechanism is the same for all three.
1. Detection of failure of the existing media path. Relay outage can be detected by failure in refreshing allocate requests periodically. Consent freshness can be used to detect media path failure E2E even if no relay servers are involved.
2. Recovery of the call by notifying the peer endpoint of the new media path to be used.

If both endpoints maintain a MTURN candidate at all times a backup path, irrespective of whether it is used for media flow or not as, the call can be trivially recovered by switching to the MTURN paths using the path switch primitive outlined below. The calls can survive as long as one end has a functioning MTURN candidate. Note that this is made viable by the use of session identifiers: a session identifier is in effect reserved for use in the event of failure e.g. as part of the ICE establishment procedures, in a way that a port cannot in practice (as it is too valuable a resource).

Another scenario is when the media relay server being used for media flow goes down for any reason both planned and unplanned.

Notifying Peer of Media Path Switch:

A path switching primitive for building the resiliency and high availability scenarios is as follows:
1. The peer 6b is notified of the path switch by adding a new attribute to a STUN binding request with a new transaction ID. The peer 6b on receiving the STUN binding request will switch to sending media to the new destination. If the peer 6b is using an MTURN candidate it will set the new remote address as the current active destination.
2. The peer 6b sends a STUN binding response which is matched by the originator 6a using the transaction ID in a STUN binding response.

With the above the path switch can be completed with one STUN binding request/response transaction. There are no new security concerns with this approach since the STUN message exchanges are message integrity protected.

Figure 13A:
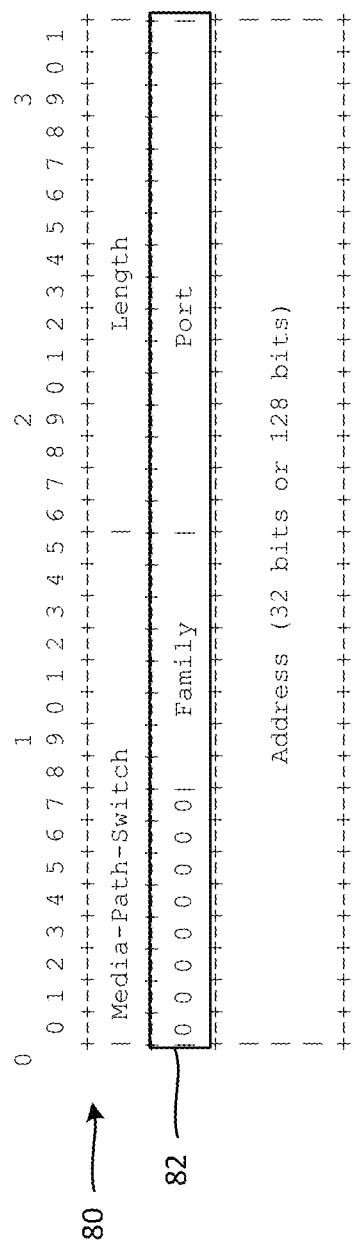
FIG. 13A shows a STUN message having an additional, new attribute.

FIG. 13A shows a possible format of the new attribute 82 added to a STUN message 80. A family field is set to one of IPv4 (e.g. indicated by 0x01) and IPv6 (e.g. indicated by 0x02). The first 8 bits of this attribute are set to 0 and are not used in this example.

Note: If the endpoint wants to switch from using a MTURN candidate on one relay to another, it will also need to include the MTURN session identifier of the MTURN allocated on the other relay. Alternatively, if the clients generate the MTURN session identifier then the client can allocate same MTURN identifier on the other relay as well and avoid adding the MTURN identifier to the path switch message.

Figure 13B:
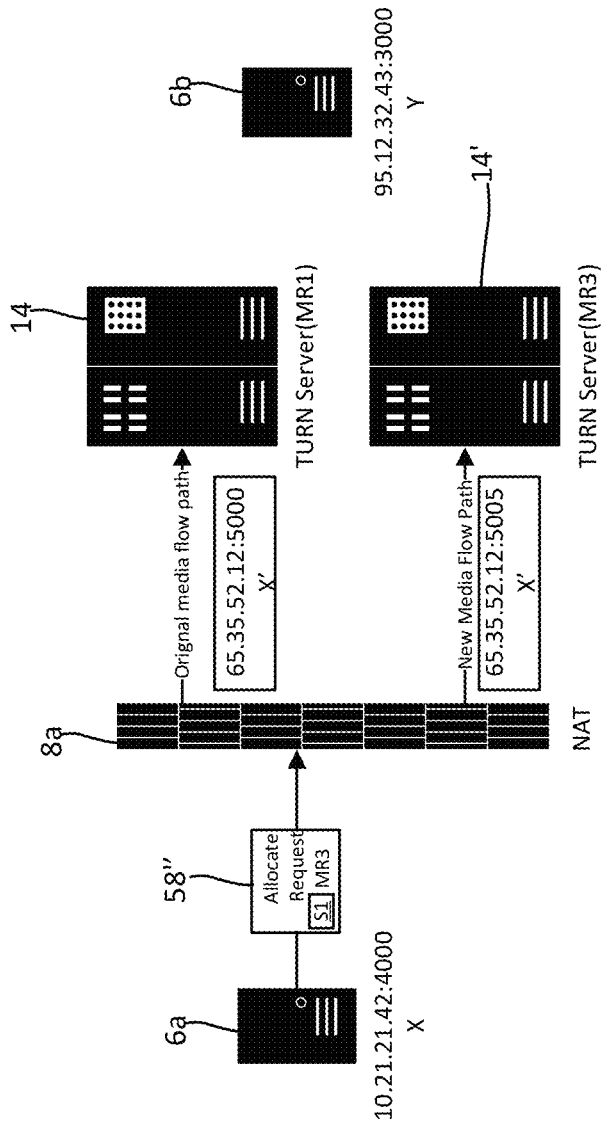
FIG. 13B shows how an existing media session may be transferred to a new media relay server.

Sample Scenario:

With reference to FIG. 13B, a failure case will now be outlined, in which the relay MR1 goes down during the middle of an established audio session. For the deployment below where the caller is behind a NAT and callee is directly accessible. The media path is from X↔MR1↔Y.

This is a more extreme example where only one endpoint has a MTURN candidate. For most scenarios at least one endpoint will have a usable MTURN candidate and media path can be switching to that path without any interruption to media flow.

Below are the steps involved in recovering this call:
1. Endpoint 6a (X) detects the media relay server 14 (MR1), previously serving it, is down by means of allocate refresh mechanism.
2. The endpoint 6a obtains a new MTURN candidate on a new media relay server 14' (MR3), by sending a fresh allocation request 58" to the new media relay 14'. This new message comprises the session identifier S1 that identified the session on the original server 14 i.e. the same session identifier S1 is used to identify a newly-created session on the new server 14. The message 58″ is integrity protected, and a session is created by the new server 14″ (subject to authentication) in the same manner as described above. The endpoint 6a may use the same port (e.g. 5000) on the public side of the NAT 8a for the new media path, or it may use a different port on the public side of the NAT 8a (e.g. 5005, as in the example of FIG. 13B)—either option is viable, though the second is more likely: this mapping depends on type of NAT in use. Some NATs will generate the same port mapping but most NAT would generate a new port mapping for the scenario illustrated in FIG. 13B. Whichever transport address used is the one that is mapped to the session identifier S1 at the new relay server 14′ so that the new relay 14′ can forward media to it.

3. In response, the endpoint 6a sends a path change request STUN binding request to the peer 6b (Y) specifying MR3=[MR3 IP]: 3479 as the new destination, where [MR3 IP] is an IP address of the new server 14′ and 3479 the audio port.
4. The peer 6b (Y) on receiving the request switches to send media packets to [MR3 IP]: 3478 instead of MR1 and also response to the STUN Binding Request.
5. On receiving the STUN binding request the call recovery process is completed.

With this the media path is switched to X↔MR2↔Y without significant impact to the existing media session i.e. the existing session is in effect transferred from the server 14 to the new server 14″ with no or minimal interruption. The time taken is substantially one RTT to allocate a new MTURN candidate and another RTT to notify the peer of the relay address change.

Instant Offer/Answer

In existing communication systems, establishing a media session typically requires the caller to gather its potential candidates to include in the offer. Similarly the callee will gather its candidates to include in the answer. This candidate gathering takes time and can impact the call setup time and perceived user experience, particularly on low bandwidth networks.

By contrast, the instant offer/answer mechanism of this disclosure allows the offer and answer generated instantly, reducing call setup time. That is, the present subject matter reduced the time it takes to establish real-time media session between the endpoints even on networks with low bandwidth.

Embodiments additionally allow the dynamic traversal of NATs, such that the call setup time reduction can be achieved without increasing the load on relay servers. This is achieved by discovering NAT mappings dynamically after the instant offer/answers have been sent (instead of including NAT mappings in the offer/answer themselves).

At least one MTURN candidate is pre-obtained and cached locally before any the call is attempted (alternatively it may be generated by the client, as described). The cached MTURN candidate does not require keep-alive probing or any additional network or processing overhead to keep the cached candidate alive, as it is only activated when the offer/answer is sent, in accordance with the MTURN protocols set out above. Moreover, NAT mappings are discovered dynamically, and NATs are effectively traversed using the cached MTURN candidate.

The "MTURN" protocol set out above in itself significantly reduces offer and answer generation time as compared with conventional TURN, even if candidates are not gathered until the start of call setup. However on poor quality networks the offer/answer generation time is still non-negligible even for MTURN, particularly when the candidate gathering process is competing with call signalling for the available bandwidth.

To this end, further protocol extensions and design are provided below, to render the transport candidates available for immediate generation of the candidate lines needed for the offer/answer, as opposed to gathering TURN/STUN candidates as part of call establishment itself.

Figure 14:
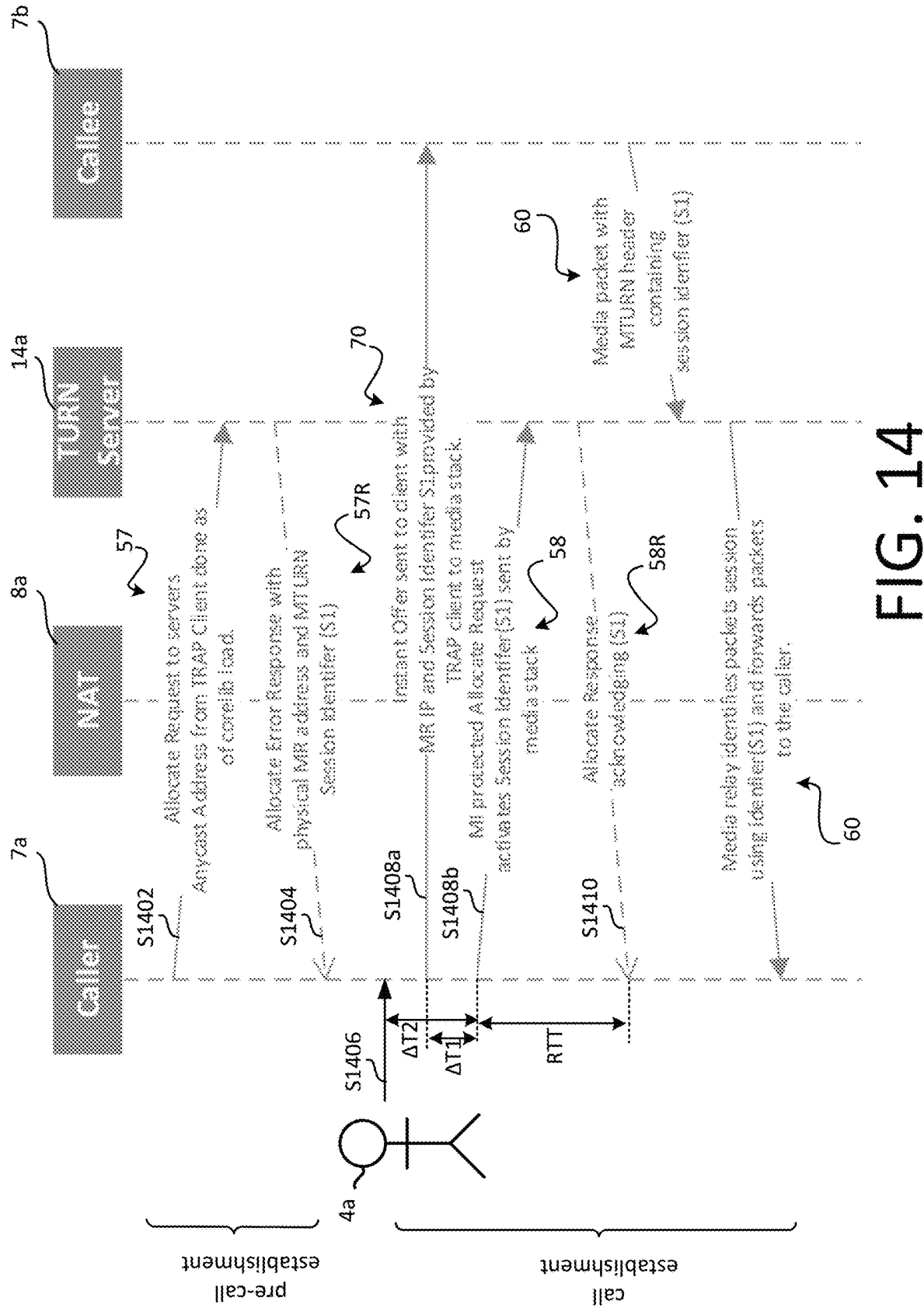
FIG. 14 shows a signalling flow for an instant offer/answer mechanism.

FIG. 14 shows a signalling diagram for (i) the steps involved in pre-allocation allocation of an MTURN ID S1 to the caller client 7a, and (ii) subsequent offer to the callee client 7b and parallel activation of S1 at the start of call establishment.

Steps S1402-S1404 constitute a pre-establishment phase, performed before call setup at any suitable time; e.g. up to hour(s), or even day(s) before. At step S1402, the caller client 7a transmits to its TURN server 14a, via the first NAT 8a, an Allocate Request 57. For example, step S1402 may be performed in response to the client 6a being initially loaded (i.e. instantiated on the processor 22 of the first user device 7a), at a time that is set by a refresh cycle, or at any other suitable time (predetermined or event-driven). The allocate request 57 for an MTURN candidate is transmitted to the media relay server's anycast address.

In response, at step S1404, the media relay server 14a sends an Allocate Error Response (401) 57R that provides, to the caller client 7a for inclusion in the offer to the callee 7b:
    a direct IP address of the media relay server 14a to the caller client 7a,
    an MTURN port associated with that address, and
    a unique MTURN session identifier S1.

At this point, as noted above, the caller's server 14a has not created a TURN session but the caller client 7a has enough information to send an offer instantaneously to the peer endpoint 6b, with zero network round trips. The MTURN candidate is formed of the direct media relay IP address, the MTURN port (which constitute a transport address MR1) and the session identifier S1.

Note that steps S1402-S1404 correspond exactly to the first two steps of FIG. 8. It is the fact that they are performed pre-emptively that enables the instant sending of the offer at step S1408b (see below). The pre-obtained MTURN candidate S1 is stored in the local memory 20 of the first user device 6a, ready for later sending to the callee 7b whenever desired.

At step S1406, after the MTURN candidate S1 has been pre-obtained at step S1404, a call instigation input is received at the caller client 7a from the first user 4a. The call instigation input may for example be instigated by the user selecting an option to call the second user 4b via a user interface (e.g. graphical user interface, natural user interface) of the client 7a, or it may be a voice or gesture input to the first user device 6a, or any other suitable under input that conveys a desire of the first user to call the callee client 7b at that moment in time. This may be hour(s), or even days(s) after the response 57R has been received at step S1406.

In direct response to the user input of S1406, the caller client 7a instantly transmits:
    an offer message 70 to the callee 6b (S1408a) and,
    in parallel, an MI protected Allocate Request 58 comprising the session identifier S1 (S1408b).

The offer message 70 can be transmitted via the SIP server 15, or some other proxy server entity that can relay it to the callee 7b (but which would not be suitable for relaying the media data of the media session itself—hence the need to discover potential paths for the media data). The offer 70 may be sent over SDP, or any other protocol suitable for session establishment.

As long the response 57R is received at the caller client 7a from its relay 14a before a call is attempted, the offer 70 will be available instantaneously with no delays. The offer 70 comprises the MTURN candidate (MR1+S1) and a host candidate of the first user device 6a in the private address space behind its NAT 8a, but no reflexive candidates i.e. it does not indicate any public transport address of the first NAT 8a. That is, it does not include any server reflexive candidate. This is true even if a server reflexive candidate has been conveyed to the caller client 7a in the response 57R from its relay server 14a during the pre-establishment phase. The reason for excluding this is that, unless keep-alive probing is used, this will no longer constitute a NAT valid mapping by the time the offer 70 is sent (as noted this may be hours or even days later)—in which case it is useless. In all other respects, steps S1408a and S1408b correspond exactly to steps 3a and 3b of FIG. 8 respectively.

As described above, the session identifier S1 is only activated based on the MI protected allocate request 57 of step S408b, which is sent at the start of call set-up. This is sent from a different socket, and hence a different transport address, than the earlier request 57 sent to obtain S1 in the first place. This is immaterial, as it is only the second allocate request 58, sent at the start of call set up, that causes the session identifier S1 to be activated i.e. the session ID S1 is associated with the source address conveyed by the later allocate request 60 after passing through the first NAT 8a. Hence, the transport address used to obtain S1 at step S1402 is immaterial; only the transport address used to activate it at step S1408b needs to be kept valid. Once S1 has been activated, a response 58R is transmitted back to the caller 7a at step S1410. Thereafter, the flow proceeds exactly as described above, with reference to FIG. 8.

Since the pre-establishment phase comprising steps S1402-S1404 is not part of call setup, there are no constraints on the time taken for candidate gathering for either the caller 7a or callee 7b. Therefore additional probing and analysis can be performed during this stage, to pre-obtain additional information ready for call setup. For example, the client 7a can determine during this pre-establishment phase whether it is possible to reach the server 14 over UDP (which may not be possible e.g. if its NAT 8a is blocking UDP). If it is determined in this pre-establishment phase that UDP communications with the server 14 is not possible, the caller client 7a can skip attempting to activate the MTURN session ID S1 over UDP (at step S1408a), as it knows this will almost certainly fail. This reduces the complexity of the activation process, and saves bandwidth that would otherwise be used unnecessarily on failed messages.

Figure 15A:
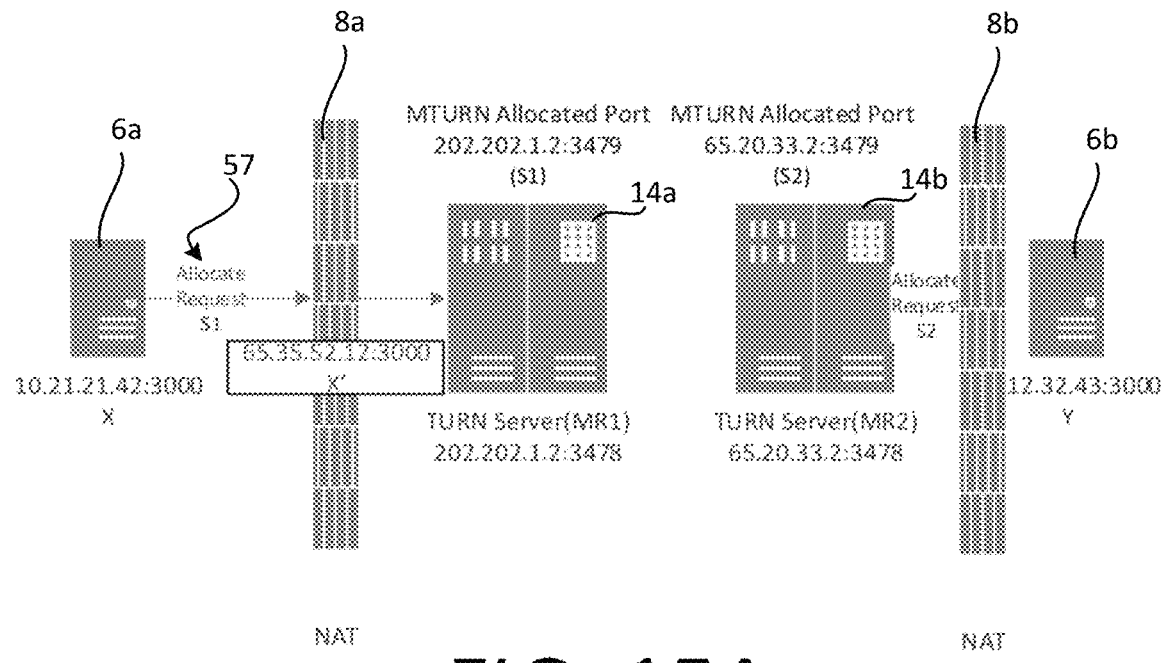
FIGS. 15A and 15B shows illustrate interactions that take place between endpoints and servers during the instant offer/answer signalling of FIG. 14.

As noted, with the instant offer generation flow of FIG. 14, the initial allocate request 57 is sent by the caller client 7a. As part of this, it the caller client may happen to discover a NAT mapping(s) as part of the NAT mapped address received in the 401 error response 57R. This is illustrated in FIG. 15A (corresponding to step S1402 of FIG. 14), which shows the caller client 7a sending the initial Allocate Request 57 (without MI) to the server 14. The caller client 6a sends an allocate request from an initial local transport address X (10.21.21.42:3000) which the NAT maps to X' (65.35.52.12:3000). The transport relay server 14a will hence see the request originate from X' (65.35.52.12:3000). The server 14a responds with a 410 error response 57R that has the MTURN session identifier of (S1), the IP address of the relay server (202.202.1.2) and the MTURN port (3478). This IP address and port constitute a transport address of the media relay 14a MR1 (202.202.1.2: 3478), which together with the session identifier S1 constitutes an MTURN candidate.

Figure 15B:
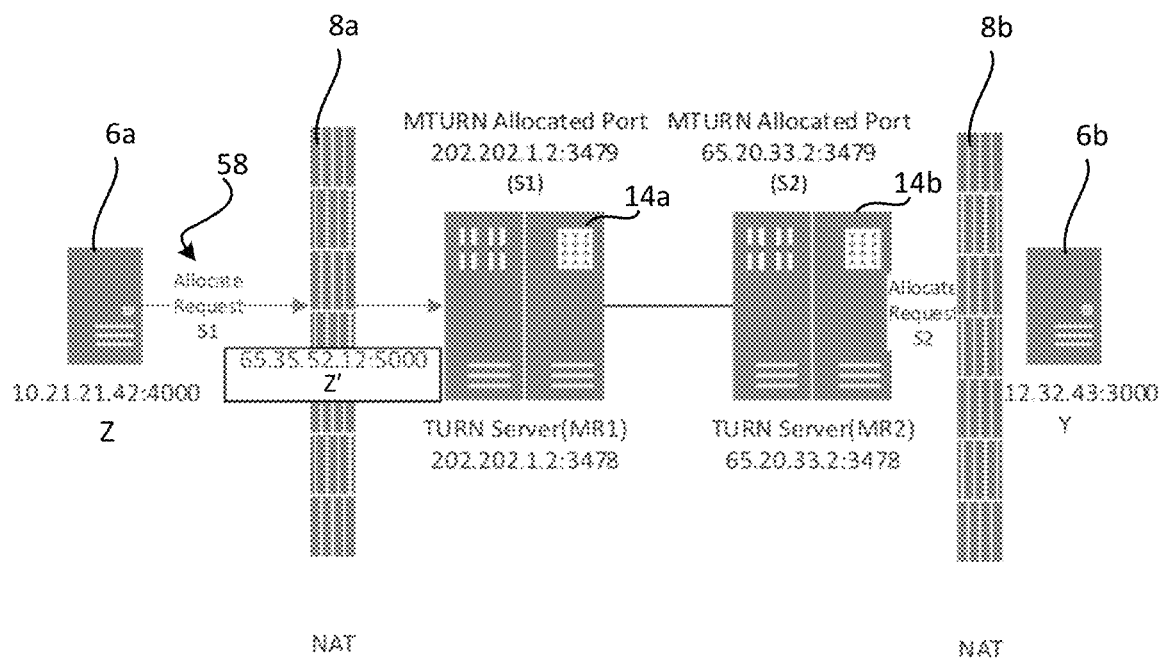

The response 57R may also indicate the public address X' to the client 6a. However, in general, the later MI protected activation 70 will sent to the relay 14a using a different socket which will have different NAT mapping. This is illustrated in FIG. 15B (corresponding to step S1408b of FIG. 14), which shows the caller 7a activating the MTURN ID S1 from a different port than earlier by the caller client 7a. That is, the client sends an allocate request with MTURN session identifier S1 from a different transport address ZX (10.21.21.42:4000—different port) which the NAT maps to Z≠X' (65.35.52.12:5000). The TURN server will see the request originate from Z' and hence create the TURN session by associating S1 with Z' (not X').

Since X' is not useful, the offer 70 generated by the caller at step S1408a includes only the host candidate and the MTURN candidate, and not X', i.e.:

Z (10.21.21.42:4000)

S1+MR1 (202.202.1.2:3478)

What is more, since the offer 70 is sent out before the activation is completed, any NAT mappings discovered after this point—for example, conveyed in the allocate response 58R of step S1410—cannot be exchanged via SDP to the peer without adding additional rounds of SDP message exchange.

After it has received the offer 70, the callee 7b can start sending media packets 60 to the caller 7a, to the transport address MR1 of the relay server 14b indicated in the offer 70, by encapsulating the packets with a thin MTURN header that includes the session identifier S1 that was provided in the offer 57, as described above.

Although not shown explicitly in FIG. 14, exactly equivalent steps are performed by the callee client 7b in order to generate an instant answer to the offer 70. For the instant offer, the receipt of the offer 70 at the client replaces the user input at step S1404. That is, before the offer 70 is received, the callee client pre-obtains its own unique session ID S2 for its own MTURN candidate in by steps equivalent to S1402 and S1404. Then, in direct response to the offer 70:

the callee client activates this session identifier S2 with its own TURN server (14b, FIG. 16) in a step equivalent to step S1408b and, in parallel, transmits an instant answer comprising its own local address Y and its own MTURN candidate MR2+S2 to the caller client 7a (equivalent to step S1408b).

As for the instant offer 70, the instant answer can be sent via an SIP proxy or other suitable proxy, using SDP or some other suitable protocol.

Accordingly, in the example of FIG. 15B, the callee 7b will send an instant answer with the following candidates:

Y (12.32.43:3000);

MR2+S2. Here MR2 is the transport address of the callee's relay 14b obtained in the same manner (65.20.33.2.3478); S2 is the callee's session identifier, pre-obtained from the second relay server 14b, before the offer 70 has been, received in the same way as S1.

Y is a private, local transport address of the callee 7b, mapped to a public address Y' on the second NAT 8b. As with the offer 60, the response has no server reflexive candidates for the same reasons.

Dynamic Discovery of NAT Mappings after Instant Offer/Answer Exchange:

The ICE protocol relies on the STUN candidate discovery and exchange of valid STUN candidates as part of the offer-answer exchange to traverse NATs successfully without requiring the relay servers for media flow. ICE protocol can successfully traverse Full Cone, IP Restricted and Port Restricted NATs without using a relay server for media flow. This functionality is important to keep the load on the relay servers at manageable levels, and ensure that relay servers are only used when absolutely necessary.

To ensure that reflexive candidates are still discovered without requiring an additional SDP exchange, and that the necessary permissions on the NATS 8a, 8b are opened up to make these dynamically discovered addresses useable, the caller and callee clients 7a, 7b cooperate, in a dynamic discovery process, as follows.

Figure 16:
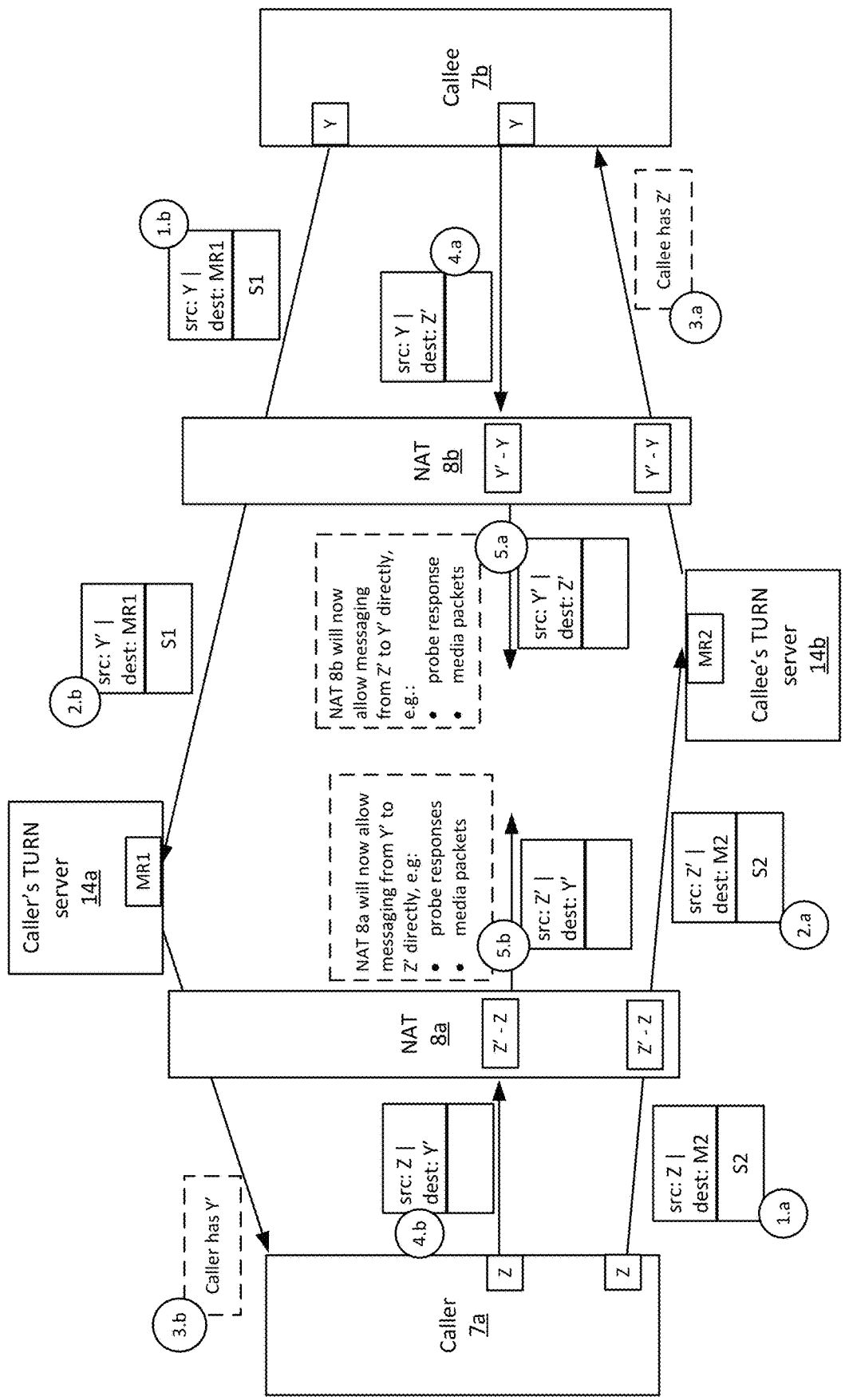
FIG. 16 shows a signalling flow performed, during connectivity checks, after an initial instant offer/answer exchange, by which NAT permissions for direct messaging between endpoints can be granted.

FIG. 16 shows the signalling flow between the clients 7a, 7b that takes place during this dynamic discovery process. This process is performed after the instant offer/answer exchange, when the clients 7a, 7b have each other's host and MTURN candidates, as part of the connectivity checks.

For connectivity checks, the candidate pairs initially available on both caller and callee (i.e. immediately after the instant offer/answer exchange) are as follows:
  Host—host, i.e. pairing of host transport addresses Z and Y. This path will not work since both addresses are in private address spaces (unless they happen to be in the same private address space).
  Host—MTURN, i.e. (X, MR2+S2) for the caller 7a; (Y, MR1+S1) for the callee 7b. This path will work in many cases, but is relatively expensive (in terms of network resources) as it requires the use of relay servers
  MTURN—MTURN i.e. pairing of MR1+S1 and MR2+S2. This path is guaranteed to work, but is expensive as it requires the use of relay servers.

Turning to FIG. 16 and focussing initially on the host-TURN path for the caller 7a, when the caller 7a sends a connectivity check request (i.e. probe message, e.g. ICE connectivity check request) from Z to the callee's MTURN candidate MR2+S2 (1.a), the message will be delivered to the callee 7b, via the callee's relay server 14b, as a result of the MTURN identifier S2 in the body of the packets. Note that, as the message is transmitted via the first NAT 4a, the message will appear to the callee 7b to have originated from Z' (2.a), hence the message will convey the caller's public address Z' to the callee (3.a). That is, the callee will see the request originating from an address Z' which was not advertised in the SDP offer 70. In response, the callee 7b creates a new peer derived remote candidate comprising Z'. So now the callee 7b has dynamically discovered the correct NAT mapping Z' of the caller 6a dynamically.

Similarly the caller 7a will also discover the Y' mapping of the callee 7b dynamically when the callee 7b performs its connectivity checks—1.b-3.b in FIG. 16, which correspond to 1.a-3.a. The callee 7b sends a connectivity check message to MR1+S1 having Y as its source address (1.a), which is changed to Y' by the second NAT 8b (2.b). The message is relayed via the first relay server 14a to the caller 7a, thereby conveying Y' to the caller 7a (3.b).

As a result Host-TURN paths are successful both caller and callee and both sides have discovered the NAT mappings. Thus far, the implementation adheres to the ICE RFC.

However at this point in the flow, the process deviates from the RFC and map newly discovered peer reflexive remote candidate only to the local host candidate, for additional connectivity checks. This contravenes ICE RFC, which states that peer reflexive remote candidates should not get paired to other local candidates (https://tools.ietf.org/html/rfc5245# section-7.2.1.3). As result both caller and callee will have the following candidate pairs listed below respectively.
  Z-Y' (caller 7a)
  Y-Z' (callee 7b)

Connectivity checks are also performed for these host-peer reflexive candidate pairs, contrary to ICE RFC. This deviating behaviour is implemented only for peer reflexive candidates discovered on connectivity checks received on the MTURN candidate.

The reason for this is that, for some types of NAT, the caller's NAT 8a will only relay messages received at Z' from Y' to Z, if a message has already been sent to Y' from Z by the caller 7a; similarly, the callee's NAT 8b may only relay messages received at Y' from Z' to Y is a message has been sent to Z' from Y be the callee 7b. Thus, for some types of NAT, even though the caller 6a now has Y', it does not yet have permission at the second NAT 8b to send messages directly to Y' (i.e. not via the callee's TURN server 14b), and the second NAT 8b would therefore disregard any such message. Similarly, for some types of NAT, even though the callee 6b now has X', it does not yet have permission at the first NAT 8a to send messages directly to Z' (i.e. not via the caller's TURN server 14a), and the first NAT 8a would therefore disregard any such message.

This issue is solved by the additional connectivity checks performed for the host-peer reflexive candidate pairs, as follows:
  4.b: the callee 7a sends a connectivity check message, via the first NAT 8a, to newly-discovered Y', with Z as is source address. Z is mapped to Z' at the first NAT 8a, and upon receiving the open up permissions on the caller's NAT 8a for Y' (5.b). With the permissions opened thus, thereafter, messages received at Z', which have Y' as their source address (e.g. a response to the connectivity check message or actual media packets) will be relayed to Z by the caller's NAT 8a.
  4.a: Similarly when a connectivity check packet is sent from Y-Z' by the callee 7b, permissions will be opened on the callee's NAT 8b for Z' in exactly the same manner (5.a).

The transport addresses mapped to the session identifiers S1, S2 at the servers 14a, 14b by the activation requests may be the same as those used in the flow of FIG. 16, i.e. MR1+S1 and MR2+S2 may be mapped at servers 14a/14b to Z' and Y' respectively. However, this is not essential: the caller and the callee 7a, 7b can use different transport addresses for receiving data form the relay servers 14a, 14b than they use for direct communication with one another. That is, MR1+S1 and MR2+S2 may be mapped to different public transport addresses on the first and second NATs 8a, 8b respectively, rather than Z' and Y'.

During the connectivity checks, both caller 7a and callee 7b will discover their own NAT mappings as peer derived local candidates on receiving the connectivity check response to at least one of their earlier probe requests. The final path selected for media flow at the end of connectivity checks will be:
  Z'-Y' (caller) with candidate types being peer derived local and peer derived remote respectively.
  Y'-Z' (callee) with candidate types being peer derived local and peer derived remote respectively.

With the above, the relevant NAT mappings are successfully discovered dynamically, and the media path can be established without using relays for media flow and without and additional rounds of SDP signalling, even though the NAT mapped candidates were not exchanged in the initial (and only) SDP offer/answer exchange.

Gathering New MTURN Candidates:

In response to any one of the trigger events set out below, the client 7a/7b will obtain at least one new MTURN candidate from its relay 14a/14b:

When the client is loaded;

Ff existing MTURN relay information is stale, i.e. has expired. This can be based on a timeout since MTURN information was gathered.

A detected network interface and/or network location change.

The client also periodically validates the IP address of the MTURN candidate provided by the relay, and refreshes if that IP address is no longer valid, e.g. because the relay has failed or has been taken down for maintenance. The validation period can be set to balance bandwidth usage, reliability and potential expected relay down times.

Failure of the activation of a pre-obtained MTURN candidate at call setup.

Multiple MTURN ID's and Related Security Considerations:

In embodiments, the client 7a maintains in the memory 20 a pool of multiple MTURN IDs (e.g. three to five). As MTURN IDs are used, new ones are obtained to maintain the size of the pool.

The server 12 implements a clean-up mechanism to expire the MTURN Ids when credentials associated with them expire. Tracing and diagnostics for MTURN ID collisions; these are unlikely to occur, and steps can be taken on the transport relay server to ensure that the MTURN identifiers are not prematurely recycled to avoid collisions. The timescale on which the client contains MTURN identifiers matches that of the clean-up mechanism, sect that session IDs are not expired when there is still a chance that the client may use them. For example, the IDs may remain valid for hour(s) or day(s) before they are expired, as appropriate.

As noted, the instant offer/answer flow of FIG. 14 is substantially identical to the MTURN allocate requests procedure described above, aside from the fact that the allocation of MTURN candidate and activation of MTURN candidate is separated in time. The duration between initial allocate request and the MI protected allocate request from the media stack layer could be arbitrarily long.

This change opens up the possibility of an attacker reserving a large number of MTURN IDs resulting in degraded performance or, in the worst case, denial of service (DOS). To mitigate this, the relay 14 may tie the issuance of session identifier to usernames (or other user identifiers) within the communication system.

In the example of FIG. 14, this means the server 14 validating a username of the user 4a before sending the 401 allocate error response with the MTURN ID, such that a session ID can only be obtained by someone who has a valid username. The server 14 also sets a maximum cap on the number of inactive MTURN IDs that issued to any one user name.

Note that "unique" in the present context means at sufficiently unique that different sessions being relayed via the same media relay server port cab be distinguished. In some, though not all, cases, identifiers may be globally unique, e.g. to enable unchecked client-side verification and/or to enable transfer of sessions between media relay servers, for example due to failure. The level of uniqueness that is needed will be apparent in any given context.

A first aspect of the present subject matter is directed to a method of establishing a media session between a first endpoint and a second endpoint, the method comprising: transmitting from the first endpoint to the second endpoint a message indicating a first server network address of a media relay server available to the first endpoint and comprising a unique session identifier; and transmitting from the first endpoint to the media relay server, in parallel with the message, an activation request comprising the unique session identifier, thereby activating the session identifier by causing it to be associated at the media relay server with a source address conveyed by the activation request; wherein once the session identifier has been activated, a media packet received from the second endpoint at the first server network address that comprises the unique session identifier is relayed from the media relay server to the source address for receiving by the first endpoint.

In embodiments, the message may be an offer message, and the offer message and the activation request may be transmitted in direct response to a session instigation input received at the first endpoint (e.g. from a user of the first endpoint).

Alternatively, the message may be an answer message, and the answer message and the activation request may be transmitted in direct response to an offer message received at the first endpoint from the second endpoint.

In such embodiments, any event that is disclosed herein as taking place before the message is sent also takes place before the input or offer is received.

The source address of the activation request may be a first local network address of the first endpoint when transmitted by the first endpoint.

The activation request may be transmitted via a first network address translator to which the first endpoint is connected, which generates a mapping between a first public network address of the first network address translator and the first local network address, and changes the source address of the activation request to the first public network address such that the session identifier is associated with the first public network address at the media relay server once activated.

The message transmitted to the second endpoint may not indicate the first public network address of the first network address translator. It may not indicate any public network address of the first network address translator.

For example, the first public network address of the first network address translator may be conveyed to the first endpoint, by the media relay server, after the message has been transmitted such that it cannot be included in the message to the second endpoint.

The message may be transmitted using SDP. However, no public network address of the first network address translator may ever be communicated to the second endpoint over SDP. The first endpoint may never receive, over SDP, from the second endpoint any public network address of a second network address translator to which the second endpoint is connected. That is, no public NAT addresses may be communicated over SDP at all.

The method may comprise, after transmitting the message, transmitting to the second endpoint, via a first network address translator to which the first endpoint is connected, a first outgoing probe message (e.g. an ICE connectivity check request), whereby the second endpoint can determine from the first outgoing probe message a third public network address of the first network address translator.

The third public network address of the first NAT, determined by the second endpoint, may be the same as or different than the first public network address of the first NAT, with which the session identifier is associated at the media relays server.

The method may comprise receiving from the second endpoint a response (e.g. ICE connectivity check response) to the first outgoing probe message and determining from the response the third public network address.

The first outgoing probe message may have as its source address, when transmitted, a third local network address of the first endpoint (which may be the same as or different than the first local network address from which the activation request is sent), which is mapped to the third public address at the first network address translator.

The third public network address may be different than the first public network address associated with the session identifier at the media relay server' in this case the first and third local addresses may also be different. Alternatively, the first and third network addresses may be the same as one another; in this case, the first and third network addresses may be the same as one another.

The method may comprise receiving at the first endpoint from the second endpoint an indicator of a second server network address of a media relay server available to the second endpoint, wherein the first outgoing probe message may be transmitted to the second server network address for relaying to the second endpoint. That is, the first outgoing probe message may be transmitted via a media relay server available to the second endpoint (e.g. which already has been granted permission to send messages to the second endpoint by a second network address translator to which the second endpoint is connected).

In some cases, another unique session identifier is received with the indicator of the second server network address, and the first outgoing probe message comprises the other unique session identifier.

The first outgoing probe message may have as its source address, when transmitted, the third local network address, and is transmitted to the second server network address. For example, it may be part of an ICE connectivity check for a (host, [M]TURN candidate pair).

The method may comprise: after transmitting the message, receiving at the first endpoint from the second endpoint, via a second network address translator to which the second endpoint is connected, an incoming probe message (e.g. ICE connectivity check request); and determining from the incoming probe message a second public network address of the second network address translator that is mapped to a second local address of the second endpoint at the second network address translator.

The method may comprise transmitting to the second endpoint a response (e.g. ICE connectivity check response) to the incoming probe message, which conveys to it the second public network address of the second network address translator.

The incoming probe message may be received via the media relay server available to the first endpoint.

The method may comprise transmitting to the second public network address of the second network address translator a second outgoing probe message (e.g. ICE connectivity check request).

The second outgoing probe message may have as its source address, when transmitted, the third local address of the first endpoint that is mapped to the third public address at the first network address translator, and thereby cause the first network address translator to grant the second endpoint permission to message the third public address directly. For example, the second outgoing probe may be sent as part of an ICE connectivity check for a (host, peer reflexive) candidate pair—contrary to ICE RFC—that is performed in order to open up this permission on the first network address translator. That is, the second outgoing probe message may be an ICE connectivity check request sent as part of an ICE connectivity check for a host-peer reflexive candidate pair formed of the third local address of the first endpoint and the second public address of the second endpoint.

The method may comprise receiving at the first endpoint via the first network address translator, after the permission has been granted:
 a response to the second outgoing probe message, which conveys to the first endpoint the third public network address, and/or
 a media packet;
the response and/or the media packet having been transmitted directly to the third public address by the second endpoint.

The method may comprise transmitting directly from the first endpoint to the second public network address of the second endpoint:
 an indicator of the second public network address of the second endpoint, thereby conveying it to the second endpoint; and/or
 a media packet.

This may be after the second endpoint has instigated an equivalent (host, peer reflexive) connectivity check, to open up the necessary permissions on the second network address translator.

The session identifier may be pre-allocated i.e. allocated to the first endpoint by the media relay server before the message is transmitted (before the user input or offer message is received), and the allocated session identifier may be stored at the first endpoint for subsequent transmission in the message.

To obtain the session identifier, the first endpoint may present to the media relay server a user identifier associated with the first endpoint, wherein the session identifier is allocated to the first endpoint only if the user identifier is determined to be valid by the server and/or a total number of session identifiers already allocated to that user identifier is below a threshold.

Before the message is sent, the first endpoint may send a request to the media relay server according to a preferred network protocol (e.g. UDP), wherein if no response is received, the activation request is transmitted to the media relay server according to an alternative network protocol (e.g. TCP).

To obtain the session identifier, the first endpoint may transmit to the media relay server via the first network address translator an allocation request. In response to the allocation request, the media relays server may convey to the first endpoint the session identifier and a different public network address of the first network address translator determined by the media relay server from the allocation request, wherein the different public network address in not indicated in the message transmitted to the second endpoint.

The session identifier may be a globally unique identifier generated by the first endpoint.

The network addresses may be transport addresses (IP address+port). Transport addresses are different if they have different ports, even if they have the same IP addresses.

According to a second aspect of the present subject matter, a first endpoint comprises: a network interface; and a processor configured to implement any of the method steps disclosed herein.

According to a third aspect, a computer program product comprising code stored on a computer readable storage medium and configured when executed on a computer of a first endpoint to implement any of the method steps disclosed herein.

In embodiments of the first, second and third aspects, the first endpoint and/or the second endpoint and/or the media relay server may be configured in accordance with any of the further aspects set out below, or embodiments thereof.

A fourth aspect of the present disclosure is directed to a media relay server for effecting communication events between endpoints of a network, the server comprising: a network interface assigned a server network address and having a port associated with the server network address identified by a port identifier; computer storage holding a port multiplexing database associated with the port; a resource allocation module configured to: receive multiple allocation requests from the network, each allocation request indicating a different endpoint network address, and store each endpoint network address in association with a unique session identifier in the database; an input configured to receive multiple media streams from the network via the port simultaneously, each stream being directed to the server network address and indicating the port identifier and a separate target session identifier; and a relay module configured to, for each stream: determine the endpoint network address associated in the database with the target session identifier indicated by that stream, and transmit that stream to that endpoint network address, whereby multiple media streams are relayed to different network endpoints via the same port simultaneously.

In embodiments, the media relay server may be a TURN server.

The media relay server may comprise a session identifier allocator configured to allocate a requested session identifier to a requestor.

For example, the media relay server may comprise an authentication module configured to authenticate the requestor, but the session identifier allocator may be configured to respond to the requestor with a response indicating the requested session identifier to the requestor before the requestor has been authenticated by the authentication module.

As an example, the requested session identifier may only be associated with a desired endpoint network address in the database when the requestor has been successfully authenticated by the authentication module, so that the requested session identifier cannot be used for relaying media via the port to the desired endpoint network address until then.

Alternatively or in addition, the session identifier allocator may be configured to respond directly to the requestor with a response indicating the requested session identifier to the requestor, whereby the requested session identifier is rendered available to the requestor in a single request-response exchange.

Alternatively or in addition, the session identifier allocator may be configured to respond to a provisional allocation request from the requestor with a response indicating the requested session identifier to the requestor before it has been associated with any endpoint network address in the database, so that the requested session identifier is rendered available to the requestor before it can be used for relaying media via the port to any endpoint network address.

For example, a desired endpoint network address may only be associated with the requested session identifier in the database in response to a subsequent allocation request indicating the desired endpoint network address, so that the requested session identifier cannot be used for relaying media via the port to the desired network address until then.

Alternatively or in addition, the subsequent allocation request may be message integrity protected and the media relay server may comprise an integrity verification module configured to validate the subsequent allocation request; the desired network address may be associated with the requested session identifier in the database only if the subsequent allocation request is determined to valid by the integrity verification module.

In some cases, the provisional allocation request may not be message integrity protected.

At least one of the session identifiers may have been received from the network. For example the at least one session identifier may have been generated at one of the endpoints. Alternatively or additionally, it may be that the at least one session identifier was previously being used at another media relay server to relay an existing media stream to an endpoint, whereby the existing media stream is redirected to the media relay server for continued relaying to that endpoint via the media relay server instead.

The media relay server may comprise a reallocation module configured, in response to a reallocation request from the network indicating a new endpoint network address and a session identifier that has already been stored in the database in association with a current endpoint network address, to update the database to associate the already stored session identifier with the new endpoint network address instead.

For example, the update may be performed whilst an existing media stream is being relayed to the current network address, and the relay module may be configured to redirect the existing media stream to the new endpoint network address in response.

For at least one of the network endpoint addresses, the following may also be stored in association with the at least one endpoint network address in the database: another server network address of another media relay server and another session identifier. The media relay module may be configured to:

receive another media stream from a network endpoint having the at least one endpoint network address, the other media stream including another port identifier of a port of the other media relay server, and modify the other media stream to include the other session identifier in addition to the other port identifier and relay the modified media stream to the port of the other media relay server via the network, thereby allowing the other media relay server to also relay media streams to different endpoints via the port of the other media relay server simultaneously.

The session identifiers may have a size of at least 64 bits.

The media relay server may comprise multiple ports, each associated with a different media modality, wherein all media streams of that media modality that are directed to the server network address are relayed via that port.

Each media stream may comprise:

network layer header data encoding the server network address, thereby directing the stream to the server network address at the network layer;

transport layer header data encoding the port identifier, thereby indicating the port identifier at the transport layer; and application layer data encoding the target session identifier, thereby indicating the target session identifier at the application layer.

A fifth aspect is directed to a method of effecting communication events between endpoints of a network via a media relay server, wherein the media relay server comprises a network interface assigned a server network address and having a port associated with the server network address identified by a port identifier, wherein the method comprises, at the media relay server:
  receiving multiple allocation requests from the network, each allocation request indicating a different endpoint network address;
  storing each endpoint network address in association with a unique session identifier in a port multiplexing database associated with the port;
  receiving multiple media streams from the network via the port simultaneously, each stream being directed to the server network address and indicating the port identifier and a separate target session identifier; and
  for each stream: determining the endpoint network address associated in the database with the target session identifier indicated by that stream, and transmitting that stream to that endpoint network address, whereby multiple media streams are relayed to different network endpoints via the same port simultaneously.

A sixth aspect is directed to a computer-implemented method for effecting a media session between an initiating endpoint and a responding endpoint via a communication network, the method comprising implementing at a computer of at least one of the initiating endpoint and responding endpoint the following steps:
  generating at the endpoint a set of candidate pairs, each comprising a respective network address available to the initiating endpoint and a respective network address available to the responding endpoint by exchanging network addresses between the initiating endpoint and the responding endpoint; and
  establishing the media session using a candidate pair of the set determined to be valid by the endpoints performing connectivity checks for at least one candidate pair of the set to determine whether or not the candidate pair is valid;
The set includes a multiplexed relayed candidate pair which comprises a multiplexed relayed candidate formed by: a server network address of a media relay server available to at least one of the endpoints, a port identifier of a port of the media relay server associated with the server network address, and a separate unique session identifier to allow multiple media streams to be relayed via the port of the media relay server simultaneously.

In embodiments, the candidate pair used to establish the media session may not be the multiplexed relayed candidate pair, and the method may also comprise: storing the multiplexed relayed candidate pair in memory accessible to the endpoint; detecting a failure of the established media session; and in response, re-establishing the failed media session using the stored multiplexed relayed candidate pair, wherein the media session is re-established without re-performing connectivity checks.

Alternatively, the candidate pair used to establish the media session may be the multiplexed relayed candidate pair, and the method may also comprise: detecting an outage of the media relay server (e.g. failure of the media relay server, and a planned outage of the media relay server); in response, transmitting the session identifier to a new media relay server and re-establishing the media session using a new multiplexed relayed candidate formed by: a server network address of the new media relay server, a port identifier of a port of the new media relay server associated with the server network address of the new media relay server, and the session identifier, whereby the media session is re-established using the same session identifier.

The multiplexed relayed candidate may be generated by the endpoint transmitting a message comprising a local network address of the endpoint to the media relay server for association with the session identifier, whereby media data directed to the multiplexed relayed candidate is relayed to the local network address.

For example the message may be transmitted to the media relay server via a network address translator, which modifies the message to replace the local network address with a public network address of the network address translator, whereby media data directed to the multiplexed relayed candidate is relayed to the local network address via the network address translator.

Alternatively or in addition, the method may comprise the endpoint performing a local interface switching procedure, which comprises: during the established media session, the endpoint transmitting a message comprising a new local network address of the endpoint to the media relay server for association with the session identifier, thereby causing media data that is directed to the multiplexed relayed candidate thereafter during the established media session to be relayed to the new local network address instead.

The method may comprise the endpoint transmitting a session identifier request to the media relay server, the session identifier being returned by the media relay server in response.

In some cases, the method may comprise an authentication process in which the endpoint transmits at least one authentication message to the server to authenticate the endpoint to the media relay server, the session identifier being received at the endpoint before the authentication process has been completed.

The session identifier request may not be message integrity protected and the at least one authentication message may be message integrity protected.

Alternatively or in addition, the at least one authentication message may comprise a local network address of the endpoint, to which media data transmitted to the multiplexed relayed candidate is to be relayed by the media relay server during the media session.

Alternatively or in addition, the port of the media relay server is a UDP port, whereby media data is directed to the multiplexed relayed candidate over UDP, and the session identifier request may be transmitted by the endpoint the media relay server over TCP.

The connectivity checks may comprise: assigning to each candidate pair a respective priority, wherein the multiplexed relayed candidate pair is assigned a lower priority than one or more candidate pairs that do not include any server network address; and checking the candidate pairs in order of priority until reaching the candidate pair that is determined to be valid.

For example, the one or more candidate pairs may each comprise:
  a local network address of one of the endpoints; and/or
  a reflexive network address, which is a public network address of a network address translator available to one of the endpoints.

Alternatively or in addition, the respective priority may be assigned based on a type assigned to a network address of each candidate pair, each assigned type being one of a set of types comprising: a local type, a reflexive type and a multiplexed relayed type, the multiplexed relayed candidate assigned the multiplexed relayed type. Optionally the set of types may also include a non-multiplexed relayed type.

The other network address in the multiplexed relayed candidate pair may be:
- a host network address, which is a public network address local to the other endpoint;
- a reflexive network address, which is a public network address of a network address translator available to the other endpoint; or
- another server network address available to the other endpoint.

The multiplexed relayed candidate pair may comprise another multiplexed relayed candidate formed by: the other server network address, a port identifier of a port associated with the other server network address, and another separate unique session identifier.

According to a seventh aspect a computer device for effecting a media session via a communication network between the user device and another endpoint of the communication network comprises: a network interface configured to connect to the communications network; a memory; a processor coupled to the memory and configured to execute operations of: generating in the memory a set of candidate pairs, each comprising a respective network address available to the computer device and a respective network address available to the other endpoint by exchanging network addresses between the computer device and the responding endpoint via the network interface, and establishing the media session, via the network interface, using a candidate pair of the set determined to be valid by performing connectivity checks for at least one candidate pair of the set to determine whether or not the candidate pair is valid. The set includes a multiplexed relayed candidate pair which comprises a multiplexed relayed candidate formed by: a server network address of a media relay server available to at least one of the endpoints, a port identifier of a port of the media relay server associated with the server network address, and a separate unique session identifier to allow multiple media streams to be relayed via the port of the media relay server simultaneously.

According to an eighth aspect a computer program product comprises code stored on a computer readable storage medium and configured when executed to implement any of the method steps or device (e.g. server, user device) functionality disclosed herein.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
one or more computer-readable storage media storing instructions that are executable by the one or more processors to perform operations including:
receiving, at a first device and before initiation of a communication session, an offer from a second device to participate in the communication session, the offer including a server address for a server and a session identifier for the communication session;
communicating one or more packets of the communication session to the server addressed with the server address, the one or more packets including the session identifier effective to cause the one or more packets to be forwarded from the server to the second device; and
participating in a network address discovery process between the first device and the second device to enable the first device to discover a network address of the second device, and the second device to discover a network address of the first device such that packets subsequent to the one or more packets of the communication session are routable directly between the first device and the second device by enabling the first device to address a first subsequent packet of the communication session using the network address of the second device, and by enabling the second device to address a second subsequent packet of the communication session using the network address of the first device.

2. A system as described in claim 1, wherein the offer does not include a network address of a network address translator.

3. A system as described in claim 1, wherein the offer includes a port identifier to be used for transmitting the one or more packets to the server, and wherein the operations further include addressing the one or more packets using the port identifier.

4. A system as described in claim 1, wherein the offer includes a port identifier to be used for transmitting the one or more packets to the server, the port identifier being specific to a particular type of communication modality, and wherein the operations further include addressing the one or more packets using the port identifier.

5. A system as described in claim 1, wherein the offer includes a port identifier to be used for transmitting the one or more packets to the server, the port identifier being specific to a particular quality of service, and wherein the operations further include addressing the one or more packets using the port identifier.

6. A system as described in claim 1, wherein the one or more packets include communication media of the communication session.

7. A system as described in claim 1, wherein the network address of the second device comprises a network address of a network address translator that is communicatively associated with the second device.

8. A system as described in claim 1, wherein the operations further include:
obtaining, prior to receiving the offer from the second device, a different session identifier;
causing, based on the offer from the second device, the different session identifier to be activated at a different server; and
communicating an answer to the second device, the answer including the different session identifier and a server address for the different server, wherein the session identifier and the different session identifier are usable as part of the network address discovery process.

9. A method comprising:
receiving, at a first device and before initiation of a communication session, an offer from a second device to participate in the communication session, the offer including a server address for a server and a session identifier for the communication session;
communicating one or more packets of the communication session to the server addressed with the server address, the one or more packets including the session identifier effective to cause the one or more packets to be forwarded from the server to the second device; and
participating in a network address discovery process between the first device and the second device to enable the first device to discover a network address of the second device, and the second device to discover a network address of the first device such that packets subsequent to the one or more packets of the communication session are routable directly between the first device and the second device by enabling the first device to address a first subsequent packet of the communication session using the network address of the second device, and by enabling the second device to address a second subsequent packet of the communication session using the network address of the first device.

10. A method as recited in claim 9, wherein the offer includes a port identifier to be used for transmitting the one or more packets to the server, and wherein the method further comprises addressing the one or more packets using the port identifier.

11. A method as recited in claim 9, wherein the offer includes a port identifier to be used for transmitting the one or more packets to the server, the port identifier being specific to a particular type of communication modality, and wherein the method further comprises addressing the one or more packets using the port identifier.

12. A method as recited in claim 9, wherein the offer includes a port identifier to be used for transmitting the one or more packets to the server, the port identifier being specific to a particular quality of service, and wherein the method further comprises addressing the one or more packets using the port identifier.

13. A method as recited in claim 9, further comprising communicating an answer to the offer to the second device, the answer comprising a different session identifier, wherein the session identifier and the different session identifier are usable as part of the network address discovery process.

14. A method as recited in claim 9, further comprising:
obtaining, prior to receiving the offer from the second device, a different session identifier;
causing, based on the offer from the second device, the different session identifier to be activated at a different server; and
communicating an answer to the second device, the answer including the different session identifier and a server address for the different server, wherein the session identifier and the different session identifier are usable as part of the network address discovery process.

15. A system comprising:
one or more processors; and
one or more computer-readable storage media storing instructions that are executable by the one or more processors to perform operations including:
communicating an allocation request including a network address of a first device;
receiving, prior to initiation of a communication session, a response to the allocation request including a session identifier;
receiving, after the response to the allocation request, an offer from a second device to establish the communication session with the second device;
communicating an activation request that includes the session identifier and a transport address for the first device, the activation request indicating that the session identifier is to be activated for the communication session; and
receiving media of the communication session at the first device addressed with the transport address.

16. A system as described in claim 15, wherein the allocation request and the activation request are communicated from the first device to a server.

17. A system as described in claim 15, wherein the offer includes a different session identifier and a different transport address associated with the second device, and wherein the operations further include communicating one or more packets of the communication session to the second device addressed with the different transport address.

18. A system as described in claim 15, wherein the offer includes a port identifier associated with a particular modality, and wherein the operations further include communicating one or more packets that include the particular modality addressed with the port identifier.

19. A system as described in claim 15, wherein the offer includes a different session identifier and a different transport address associated with the second device, and wherein the operations further include:
communicating one or more packets of the communication session to the second device addressed with the different transport address; and participating in a network address discovery process to enable the first device to discover a network address of the second device such that packets of the communication session that are subsequent to the one or more packets are directly routable from the first device to the second device.

20. A system as described in claim 15, wherein the transport address comprises an address of a server that is communicably associated with the first device, and wherein the operations further include participating in a network address discovery process to enable the second device to discover a network address of the first device such that one or more packets of the communication session are directly routable to the first device via the network address.

\* \* \* \* \*